(12) United States Patent
Seo et al.

(10) Patent No.: US 10,637,934 B2
(45) Date of Patent: Apr. 28, 2020

(54) ELECTRONIC DEVICE AND METHOD OF PROVIDING SERVICE IN ELECTRONIC DEVICE

(71) Applicant: Samsung Electronics Co., Ltd., Suwon-si, Gyeonggi-do (KR)

(72) Inventors: Ji-Hwan Seo, Suwon-si (KR); Dae-Ho Lee, Suwon-si (KR); Myeong-Gi Jeong, Incheon (KR); Chi-Hyun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 14/955,807

(22) Filed: Dec. 1, 2015

(65) Prior Publication Data
US 2016/0156723 A1 Jun. 2, 2016

(30) Foreign Application Priority Data

Dec. 2, 2014 (KR) ........................ 10-2014-0170513

(51) Int. Cl.
*H04L 29/08* (2006.01)
(52) U.S. Cl.
CPC ................................. *H04L 67/148* (2013.01)
(58) Field of Classification Search
CPC ....... H04L 12/24; H04L 29/08; H04L 67/148; H04L 41/12; H04L 65/4084; G06F 17/3082; G06F 17/30038
See application file for complete search history.

(56) References Cited

U.S. PATENT DOCUMENTS

| 7,293,279 B1 * | 11/2007 | Asmussen ............ H04N 5/4401 348/E5.099 |
| 8,423,071 B1 * | 4/2013 | Sun ........................ H04L 65/80 370/318 |
| 2005/0120377 A1 * | 6/2005 | Carlucci ............... G06F 3/0482 725/90 |
| 2007/0250901 A1 * | 10/2007 | McIntire ............ H04N 7/17318 725/146 |
| 2008/0195664 A1 * | 8/2008 | Maharajh .......... G06F 17/30035 |
| 2008/0200154 A1 * | 8/2008 | Maharajh .......... G06F 17/30035 455/414.3 |
| 2008/0201225 A1 * | 8/2008 | Maharajh .......... G06F 17/30035 705/14.43 |

(Continued)

FOREIGN PATENT DOCUMENTS

| CN | 101873637 A | 10/2010 |
| CN | 103096482 A | 5/2013 |

(Continued)

OTHER PUBLICATIONS

Chinese Office Action dated Oct. 9, 2019, issued in Chinese Patent Application No. 201510874241.3.

*Primary Examiner* — Benjamin M Thieu
(74) *Attorney, Agent, or Firm* — Jefferson IP Law, LLP

(57) ABSTRACT

An electronic device is provided. The electronic device includes an output unit configured to output a first service provided from a first device and a controller configured to perform control so that when reception of the first service is paused, and a second device providing at least one second service corresponding to the first service is searched, a request for the at least one second service is sent to the second device.

22 Claims, 21 Drawing Sheets

(56) References Cited

U.S. PATENT DOCUMENTS

| | | | |
|---|---|---|---|
| 2009/0073675 A1* | 3/2009 | Takata | G02F 1/133608 362/97.1 |
| 2009/0216351 A1* | 8/2009 | Van Horck | H04L 29/06027 700/94 |
| 2011/0009126 A1 | 1/2011 | Lee | |
| 2011/0055418 A1 | 3/2011 | Min et al. | |
| 2011/0107379 A1* | 5/2011 | Lajoie | H04L 65/1016 725/87 |
| 2011/0219105 A1 | 9/2011 | Kryze et al. | |
| 2011/0225417 A1* | 9/2011 | Maharajh | G06F 21/10 713/150 |
| 2012/0078997 A1* | 3/2012 | Evans | G06Q 10/00 709/203 |
| 2012/0084364 A1 | 4/2012 | Sivavakeesar | |
| 2013/0074133 A1* | 3/2013 | Hwang | G06F 17/30038 725/93 |
| 2013/0120666 A1 | 5/2013 | Sharif-Ahmadi et al. | |
| 2013/0211567 A1* | 8/2013 | Oganesyan | H04W 4/20 700/94 |
| 2013/0346494 A1 | 12/2013 | Nakfour et al. | |
| 2013/0347029 A1* | 12/2013 | Tang | G06F 17/30029 725/32 |
| 2014/0059432 A1* | 2/2014 | Johansson | G06F 3/167 715/719 |
| 2014/0274185 A1* | 9/2014 | Luna | H04W 76/02 455/517 |
| 2015/0244794 A1* | 8/2015 | Poletto | H04L 67/1085 715/748 |
| 2015/0350714 A1* | 12/2015 | Normile | H04N 21/433 725/32 |
| 2016/0094600 A1* | 3/2016 | Besehanic | H04L 65/4084 709/219 |
| 2016/0142941 A1* | 5/2016 | Ganesh | H04W 28/20 455/41.2 |
| 2016/0234346 A1* | 8/2016 | Degani | H04L 67/04 |

FOREIGN PATENT DOCUMENTS

| | | |
|---|---|---|
| JP | 5170777 B2 | 3/2013 |
| KR | 10-1015811 B1 | 2/2011 |
| WO | 2011/091296 A1 | 7/2011 |
| WO | 2012/009136 A1 | 1/2012 |

* cited by examiner

ELECTRONIC DEVICE AND METHOD OF PROVIDING SERVICE IN ELECTRONIC DEVICE

CROSS-REFERENCE TO RELATED APPLICATION(S)

This application claims the benefit under 35 U.S.C. § 119(a) of a Korean patent application filed on Dec. 2, 2014 in the Korean Intellectual Property Office and assigned Serial No. 10-2014-0170513, the entire disclosure of which is hereby incorporated by reference.

TECHNICAL FIELD

The present disclosure relates to electronic devices and methods for providing services in electronic devices.

BACKGROUND

Generally, the term "electronic device" refers to a device that performs a particular function according to its equipped program, such as a home appliance, an electronic scheduler, a portable multimedia player, a mobile communication terminal, a tablet personal computer (PC), a video/sound device, a desktop PC or laptop computer, a navigation for automobile, etc. In some instances, an electronic device may output stored information as a voice or an image. As electronic devices are highly integrated, and high-speed, high-volume wireless communication becomes commonplace, mobile communication terminals are recently being equipped with various additional functions.

For example, an electronic device comes with the integrated functionality, including an entertainment function, such as playing video games, a multimedia function, such as replaying music/videos, a communication and security function for mobile banking, and a scheduling or e-wallet function.

Further, an electronic device may receive various services from another electronic device or a server through communication functions.

When various types of services are provided through an electronic device, the provision of the services may be terminated or paused due to a diversity of factors, such as an environmental variation in the server providing the services, an environmental variation in the user or the electronic device being used by the user, or an environmental variation in the network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above mentioned problems and/or disadvantages and to provide at least the advantages described below. Accordingly, an aspect of the present disclosure is to provide an electronic device and method for providing a service in the electronic device, which, when a service provided to the user in the electronic device is terminated or paused, may search and provide various types of services corresponding to the terminated or paused service.

In accordance with an aspect of the present disclosure, an electronic device is provided. The electronic device includes an output unit configured to output a first service provided from a first device and a controller configured to perform control so that when reception of the first service is paused, and a second device providing at least one second service corresponding to the first service is searched, a request for the at least one second service is sent to the second device.

In accordance with another aspect of the present disclosure, a method for providing a service by an electronic device is provided. The method includes outputting a first service provided from a first device, when reception of the first service is paused, searching for a second device providing at least one second service corresponding to the first service, and sending a request for the at least one second service to the second device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
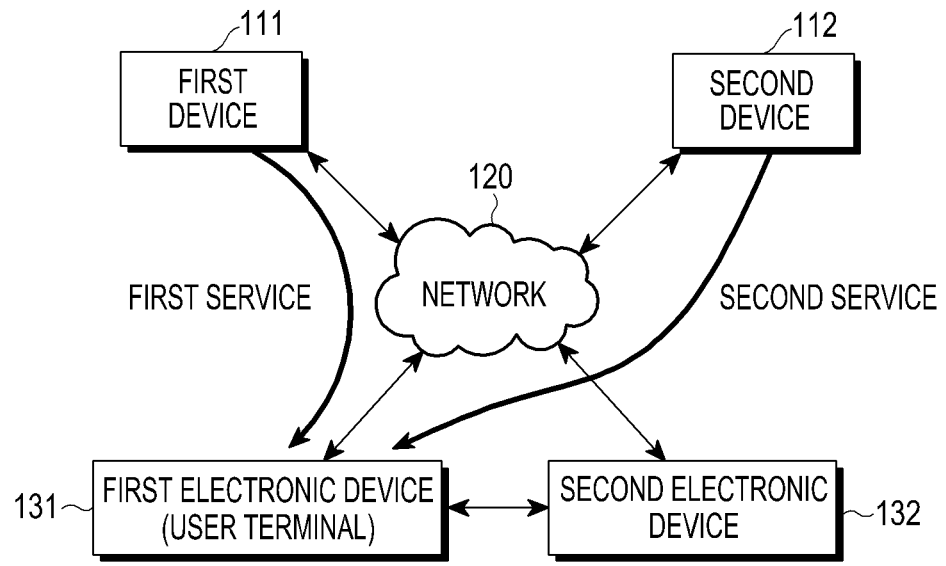
FIG. 1 is a view illustrating an example of a network configuration according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms such as "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

An example of an electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. An example of a smart home appliance may include at least one of a television, a digital versatile disc (DVD) player, an audio player, a refrigerator, an air conditioner, a cleaner, an oven, a microwave oven, a washer, a drier, an air cleaner, a set-top box, a home automation control panel, a security control panel, a television (TV) box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, an example of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, an example of the electronic device may include at least one of a part of furniture or a building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

The term "service" used in connection with various embodiments described below collectively means various types of information or contents offerable to a user's electronic device and is not limited to a particular type of information or content. For example, according to an embodiment of the present disclosure, the service may be provided in the form of a motion picture, an image, text, a signal, a sound, a vibration, or a combination of at least one thereof.

The term "output of service" used in connection with various embodiments described below may mean that the service is provided according to the various types of services. For example, the service may be output on the screen through a display or may be output as a sound through a speaker or earphone. Further, the service may be output in the form of, e.g., a vibration or signal, and at least partial information or at least partial content of the service provided to the electronic device may be output through an external interface and may be transferred to another electronic device.

Further, the term "second service corresponding to the first service" as used in connection with various embodiments described below may include the same service as the first service or a service related to the first service. For example, when the first service is provided in the form of a video, the second service corresponding thereto may include the same video provided from the same source as the first service, a video having the same content but a different format, which is provided from a different source, various additional information related to the video, information related to the information included in the video (e.g., goods information), a combination of the various types of information or a combined form of information.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a view illustrating an example of a network configuration according to an embodiment of the present disclosure.

Referring to FIG. 1, according to an embodiment of the present disclosure, the network may include a first device 111 and/or a second device 112 providing a service and electronic devices 131 and 132 receiving the service.

For example, the first electronic device 131 may receive a first service through the network 120 from the first device 111. As described above, the first service collectively means various types of information or contents offerable to a user's electronic device and is not limited to a particular type of information or content. For example, according to an embodiment of the present disclosure, the first service may be provided in the form of a motion picture, an image, text, a signal, a sound, a vibration, or a combination of at least one thereof. According to an embodiment of the present disclosure, the first service may be provided to the first electronic device 131 through another electronic device (e.g., the second electronic device 132).

When various types of the first service are provided as described above, the provision of the services may be terminated or paused due to a diversity of factors, such as an environmental variation in the server providing the first service, an environmental variation in the user or the electronic device being used by the user, or an environmental variation in the network.

According to an embodiment of the present disclosure, the first electronic device 131 may search for at least one second service corresponding to the first service at the time that the first service is terminated or paused or after the first service is terminated or paused. As described above, the second service corresponding to the first service may include the same service as the first service or a service related to the first service. For example, when the first service is provided in the form of a video, the second service corresponding thereto may include the same video provided from the same source as the first service, a video having the same content but a different format, which is provided from a different source, various additional information related to the video, information related to the information included in the video (e.g., goods information), a combination of the various types of information or a combined form of information.

As a result of the search, when the second device 112 is searched as a device providing the second service corresponding to the first service, the first electronic device 131 may send a request for the second service to the second device 112. The second device 112 may provide the second service to the first electronic device 131 in response to the request from the first electronic device 131.

According to an embodiment of the present disclosure, the second service may be provided to the first electronic device 131 through the second electronic device 132. Further, according to an embodiment of the present disclosure, the second service may be output through the second electronic device 132. Further, according to an embodiment of the present disclosure, the second service provided to the second electronic device 132 may be the same or different from the second service provided to the first electronic device 131. For example, when the second service is provided through the second electronic device 132 to the first electronic device 131, the second electronic device 132 may transmit the second service received from the second device 112 to the first electronic device 131 as it is or may transmit, to the first electronic device 131, information obtained by modifying or processing the received second service or information related to the second service.

Further, when the second service is provided to the first electronic device 131, the battery may be unnecessarily consumed due to an automated connection operation for the paused first service. According to an embodiment of the present disclosure, when the provision of the first service in the first electronic device 131 is paused and the second service corresponding to the first service is provided and output, the automated connection operation for the first service may be stopped. Further, according to an embodiment of the present disclosure, when the provision of the second service is terminated or paused, the automated connection operation for the paused first service may be resumed.

According to various embodiments of the present disclosure, forms of providing services are now described with reference to FIGS. 2, 3, 4, 5, 6, 7A, and 7B.

Figure 2:
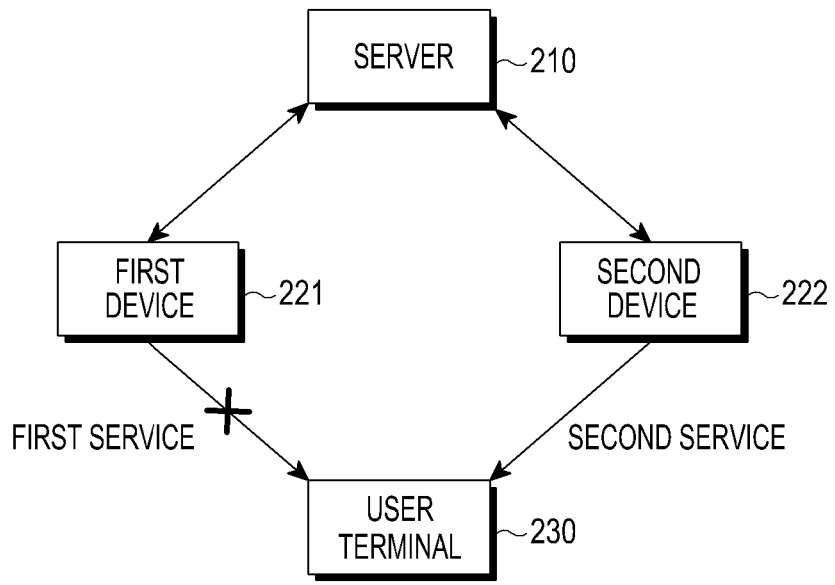
FIG. 2 is a view illustrating an example of a network configuration according to an embodiment of the present disclosure.

FIG. 2 is a view illustrating an example of a configuration of a network according to an embodiment of the present disclosure.

Referring to FIG. 2, a user terminal 230 may receive a first service provided from a server 210 through a first device 221. When the first service is output in the user terminal 230 or after the output of the first service is terminated or paused, information related to the first service may be collected or stored. In the following embodiments as described in FIGS. 2, 3, 4, 5, 6, 7A, and 7B, the user terminals 230, 320, 421, 422, 520, 620, and 760 may be the electronic devices 131 and 132 shown in FIG. 1.

When the provision of the first service is terminated or paused due to various factors, such as an environmental variation in the server providing the first service, an environmental variation in the user or the electronic device being used, or an environmental variation in the network, the second service corresponding to the first service may be searched at the time of the termination or pause of the provision of the first service or after the provision of the first service is terminated or paused (e.g., periodically or at a predetermined time). Various embodiments for methods for searching the second service are described below.

As a result of the search, when the searched second service may be provided through a second device 222, the user terminal 230 may send a request for the second service to the second device 222. The user terminal 230 may receive the second service from the second device 222 in response to the request and may output the second service. The second service may be provided from the same server as the server 210 providing the first service or from another server. Further, the second service may be directly provided from the second device 222 without being provided from any server.

As an example of FIG. 2, the server 210 may be a broadcast station server, and the first device 221 may be a TV. Further, the user terminal 230 may be a watch-type wearable device, and the second device 222 may be the user's portable terminal (e.g., a smartphone). The user may receive, through the user terminal 230 (e.g., the user's wearable device), information (the first service) related to a baseball game broadcast output through the first device 221 (e.g., a TV) located inside the home.

When the user leaves home and fails to receive information from the first device 221 through the user terminal 230, such that the provision of the first service is paused, the user terminal 230 may search for a device that may provide the second service corresponding to the first service. As a result of the search for the device that may provide the second service, when the second device 222 (e.g., a smartphone) is searched, the user terminal 230 may send a request for the second service (e.g., a service related to the baseball game broadcast) corresponding to the first service to the second device 222. The user terminal 230 may receive the second service corresponding to the first service from the second device 222 according to an embodiment of the present disclosure, so that the user terminal 230 may continue to receive relevant information even under the situation where it cannot receive the first service.

Figure 3:
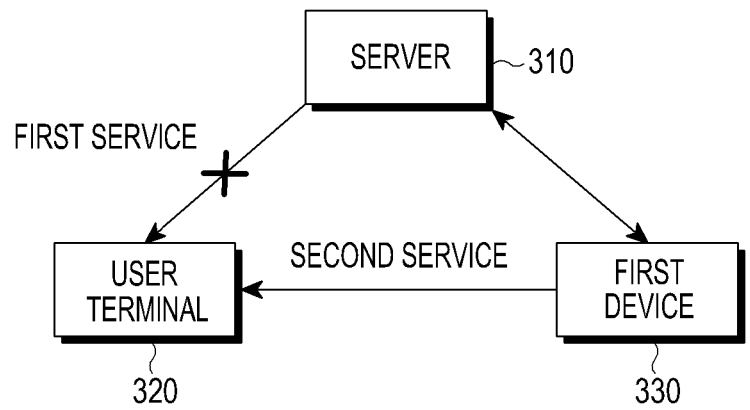
FIG. 3 is a view illustrating an example of a network configuration according to an embodiment of the present disclosure.

FIG. 3 is a view illustrating an example of a network configuration according to an embodiment of the present disclosure.

Referring to FIG. 3, a user terminal 320 may directly receive a first service from a server 310. When the first service is output in the user terminal 320 or after the output of the first service is terminated or paused, information related to the first service may be collected or stored. According to an embodiment of the present disclosure, the first service may be information related to a first device 330, information stored in the first device 330, or information collected by the first device 330. According to an embodiment of the present disclosure, the server 310, after collecting or receiving information corresponding to the first service from the first device 330, may provide the first service to the user terminal 320 based on the collected or received information.

When the provision of the first service is terminated or paused due to various factors, such as an environmental variation in the server providing the first service, an environmental variation in the user or the electronic device being used, or an environmental variation in the network, the second service corresponding to the first service may be searched at the time of the termination or pause of the provision of the first service or after the provision of the first service is terminated or paused (e.g., periodically or at a predetermined time). Various embodiments for methods for searching the second service are described below.

As a result of the search, when the searched second service may be provided through the first device 330, the user terminal 320 may send a request for the second service to the first device 330. The user terminal 320 may receive the second service from the first device 330 in response to the request and may output the second service. The second service may be provided from the same server as the server 310 providing the first service or from another server. Further, the second service may be directly provided from the first device 330 without being provided from any server.

As an example of FIG. 3, the first device 330 may be a home appliance (e.g., a washer or refrigerator), and the user terminal 320 may be a smartphone or wearable device. For example, state information on the first device 330 may be provided to the user terminal 320 through a server 310. The user may identify the state information on the first device 330 (e.g., a washer or refrigerator) by receiving the first service from the server 310 through the user terminal 320 while he is out of home. When, after the user back home, the user terminal 320 cannot receive the first service from the server 310 or may be put in the state of being able to directly communicate with the first device 330, the user terminal 320 may directly receive a second service (e.g., state information on the washer or refrigerator) corresponding to the first service from the first device 330.

Figure 4:
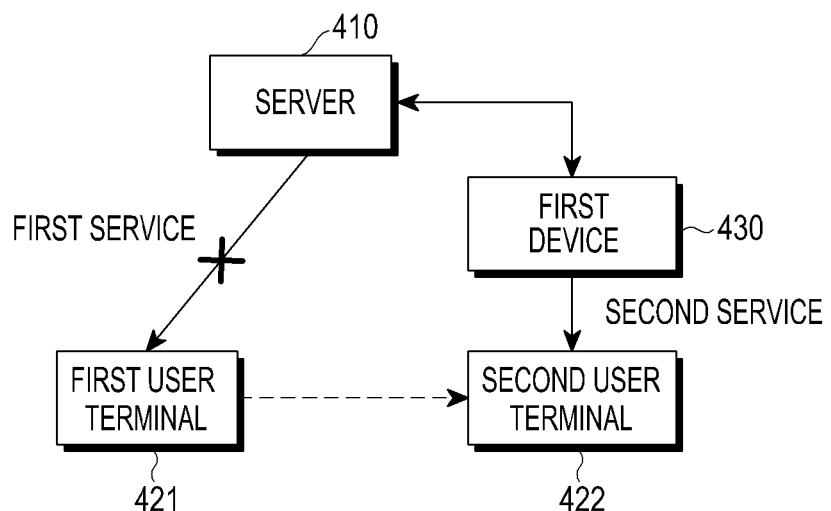
FIG. 4 is a view illustrating an example of a network configuration according to an embodiment of the present disclosure.

FIG. 4 is a view illustrating an example of a network configuration according to an embodiment of the present disclosure.

Referring to FIG. 4, a first user terminal 421 may directly receive a first service a server 410. When the first service is output in the first user terminal 421 or after the output of the first service is terminated or paused, information related to the first service may be collected or stored. According to an embodiment of the present disclosure, the first service may be information related to a first device 430, information stored in the first device 430, or information collected by the first device 430. According to an embodiment of the present disclosure, the server 410, after collecting or receiving information corresponding to the first service from the first device 430, may provide the first service to the user terminal 421 based on the collected or received information.

When the provision of the first service is terminated or paused due to various factors, such as an environmental variation in the server providing the first service, an environmental variation in the user or the electronic device being used, or an environmental variation in the network, the second service corresponding to the first service may be searched at the time of the termination or pause of the provision of the first service or after the provision of the first service is terminated or paused (e.g., periodically or at a predetermined time). Various embodiments for methods for searching the second service are described below.

As a result of the search, when the searched second service may be provided through the first device 430, the user terminal 421 may send a request for the second service to the first device 430. The user terminal 421 may receive the second service from the first device 430 in response to the request and may output the second service. Further, as shown in FIG. 4, according to an embodiment of the present disclosure, a second user terminal 422 may be determined as the device to output the second service. According to the determination of the device to output the second service, the first device 430 may provide the second service to the second user terminal 422, and the second user terminal 422 may output the provided second service. According to an embodiment of the present disclosure, the search for the second service corresponding to the first service may be performed by the first user terminal 421 receiving the first service or by the second user terminal 422 connected with the first user terminal 421 via communication.

Figure 5:
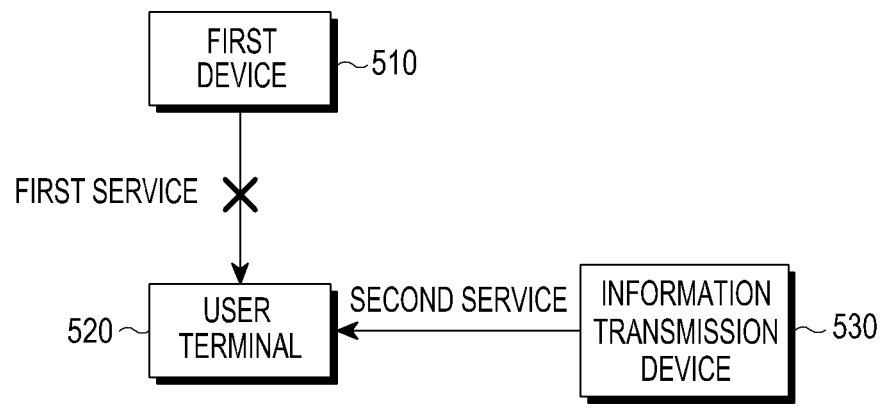
FIG. 5 is a view illustrating an example of a network configuration according to an embodiment of the present disclosure.

FIG. 5 is a view illustrating an example of a network configuration according to an embodiment of the present disclosure.

Referring to FIG. 5, the user terminal 520 may receive a first service from a server or a first device 510. When the first service is output in the user terminal 520 or after the output of the first service is terminated or paused, information related to the first service may be collected or stored.

When the provision of the first service is terminated or paused due to various factors, such as an environmental variation in the server providing the first service, an environmental variation in the user or the electronic device being used, or an environmental variation in the network, the second service corresponding to the first service may be searched at the time of the termination or pause of the provision of the first service or after the provision of the first service is terminated or paused (e.g., periodically or at a predetermined time). Various embodiments for methods for searching the second service are described below.

As a result of the search, when the searched second service may be provided through an information transmission device 530, the user terminal 520 may send a request for the second service to the information transmission device 530. According to an embodiment of the present disclosure, the user terminal 520 may receive various information from the information transmission device 530, and when the received information corresponds to the second service corresponding to the first service, may output the second service. According to an embodiment of the present disclosure, the information transmission device 530 may be any one of a wireless tag, an IoT device, and a beacon transmitter that may provide information through short-range wireless communication.

As an example of FIG. 5, the user terminal 520 may access the Internet to do shopping or may receive various contents to store relevant information. For example, the user terminal 520 may receive the first service from the first device 510 and may store information related to the received first service. According to an embodiment of the present disclosure, when the user passes by a shop associated with his shopped product, the user terminal 520 may receive information related to the shopped product from an information transmission device 530 (e.g., an IoT device) equipped in the shop. The user terminal 520 may identify the received product-related information, compare with pre-stored first service-related information, and determine whether the received product-related information corresponds to the first service. When a result of the determination shows that the information received from the information transmission device 530 corresponds to the first service, the information received from the information transmission device 530 may be output as the second service.

Further, as another example of FIG. 5, when the user terminal 520 (e.g., a wearable device) receiving location information (e.g., location information measured by a GPS module) from the first device 510 (e.g., a smartphone) encounters the situation where the location information cannot be received (e.g., when entering a building or home) or the battery of the first device 510 (e.g., a smartphone) is discharged to fail to transmit the location information, the user terminal 520 (e.g., a wearable device) may receive location information from an ambient information transmission device 530 (e.g., an IoT device) to output the same as the second service.

Figure 6:
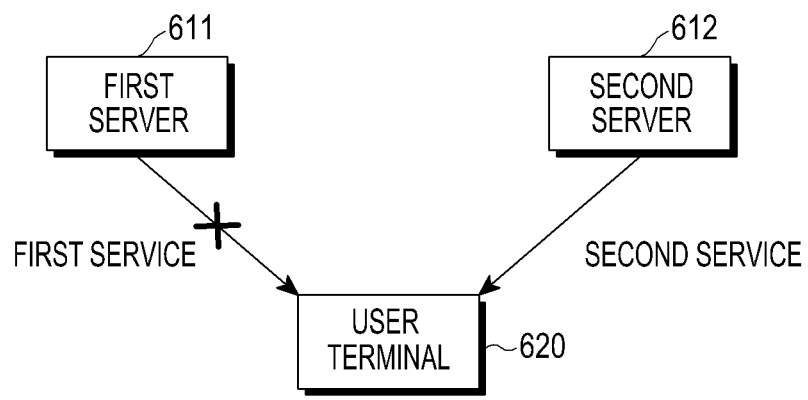
FIG. 6 is a view illustrating an example of a network configuration according to an embodiment of the present disclosure.

FIG. 6 is a view illustrating an example of a network configuration according to an embodiment of the present disclosure.

Referring to FIG. 6, a user terminal 620 may receive a first service from a first server 611. When the first service is output in the user terminal 620 or after the output of the first service is terminated or paused, information related to the first service may be collected or stored.

When the provision of the first service is terminated or paused due to various factors, such as an environmental variation in the first server providing the first service, an environmental variation in the user or the user terminal being used, or an environmental variation in the network, the second service corresponding to the first service may be searched at the time of the termination or pause of the provision of the first service or after the provision of the first service is terminated or paused (e.g., periodically or at a predetermined time). Various embodiments for methods for searching the second service are described below.

As a result of the search, when the searched second service may be provided through a second server 612, the user terminal 620 may send a request for the second service to the second server 612. The user terminal 620 may receive the second service from the second server 612 in response to the request and may output the second service.

As an example of FIG. 6, when the user who is receiving, through the user terminal 620, a service for a baseball game through the first server 611 leaves home or comes in an area where communication from the first server 611 is impossible or cannot receive the service for the baseball game through the first server 611, the user terminal 620 may store information related to the service for the baseball game and may then search for other server that may provide information corresponding to the service for the baseball game.

When the user terminal 620 moves to come within an area where a service may be provided by the second server 612 that may provide information corresponding to the service for the baseball game, the user terminal 620 may receive information corresponding to the service for the baseball game.

Figure 7A:
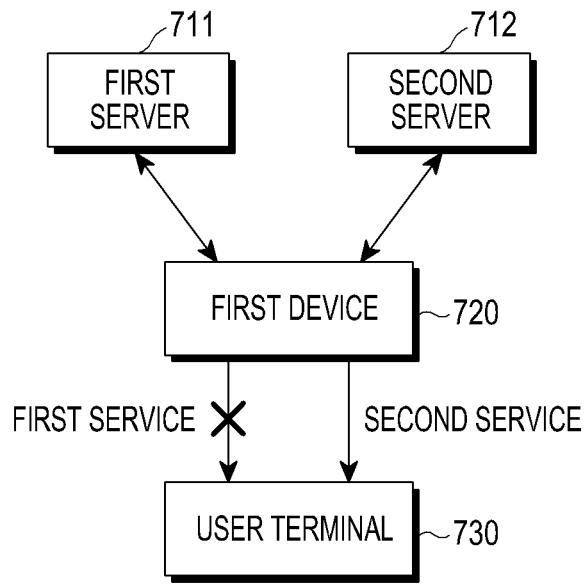
FIG. 7A is a view illustrating an example of a network configuration according to an embodiment of the present disclosure.

FIG. 7A is a view illustrating an example of a network configuration according to an embodiment of the present disclosure.

Referring to FIG. 7A, a user terminal 730 may receive a first service provided from a first server 711 through a first device 720. When the first service is output in the user terminal 730 or after the output of the first service is terminated or paused, information related to the first service may be collected or stored.

When the provision of the first service is terminated or paused due to various factors, such as an environmental variation in the server providing the first service, an environmental variation in the user or the electronic device being used, or an environmental variation in the network, the second service corresponding to the first service may be searched at the time of the termination or pause of the provision of the first service or after the provision of the first service is terminated or paused (e.g., periodically or at a predetermined time). Various embodiments for methods for searching the second service are described below.

As a result of the search, when the searched second service may be provided through a second server 712, the user terminal 730 may send a request for the second service to the first device 720 that may access the second server 712. The user terminal 730 may receive the second service from the first device 720 in response to the request and may output the second service.

As an example of FIG. 7A, when the user who is receiving, through the user terminal 730 (e.g., a wearable device), soccer game broadcast-related information received through the first device 720 (e.g., a smartphone) changes their location to do other work, the provision of the soccer game broadcast-related information may be paused. When the user doing the other work reaches an area where another service corresponding to the soccer game broadcast-related information may be provided, it may be determined whether the soccer game broadcast is terminated, and as a result of the determination, the other corresponding service may be received through the user terminal 730. The other corresponding service may be information provided from the second server 712 different from the first server 711.

Figure 7B:
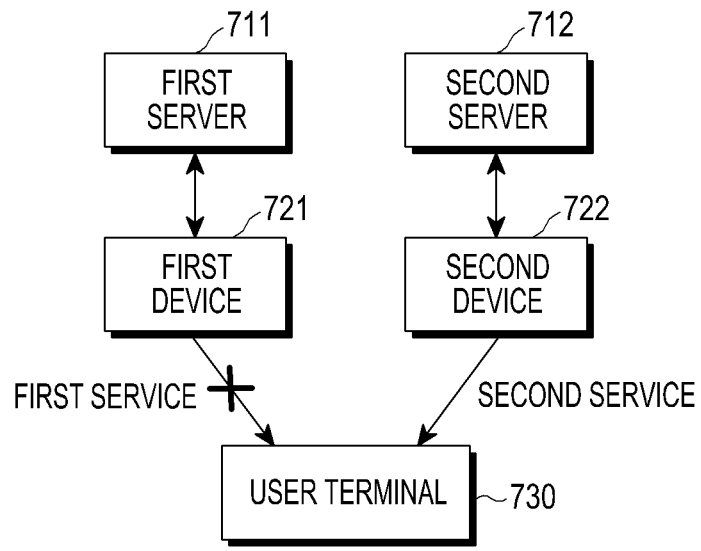
FIG. 7B is a view illustrating an example of a network configuration according to an embodiment of the present disclosure.

FIG. 7B is a view illustrating an example of a network configuration according to an embodiment of the present disclosure.

Referring to FIG. 7B, as described above in connection with FIG. 7A, the user terminal 730 may output the first service provided from the first server 711 through the first device 721. When the first service is output in the user terminal 730 or after the output of the first service is terminated or paused, information related to the first service may be collected or stored.

When the provision of the first service is terminated or paused due to various factors, such as an environmental variation in the server providing the first service, an environmental variation in the user or the electronic device being used, or an environmental variation in the network, the second service corresponding to the first service may be searched at the time of the termination or pause of the provision of the first service or after the provision of the first service is terminated or paused (e.g., periodically or at a predetermined time). Various embodiments for methods for searching the second service are described below.

As a result of the search, when the searched second service may be provided through the second server 712, the user terminal 730 may send a request for the second service to the second device 722 that may access the second server 712. The user terminal 730 may receive the second service from the second device 722 in response to the request and may output the second service.

Hereinafter, a configuration of the above-described electronic device (e.g., the user terminal) is described in more detail with reference to FIG. 8.

Figure 8:
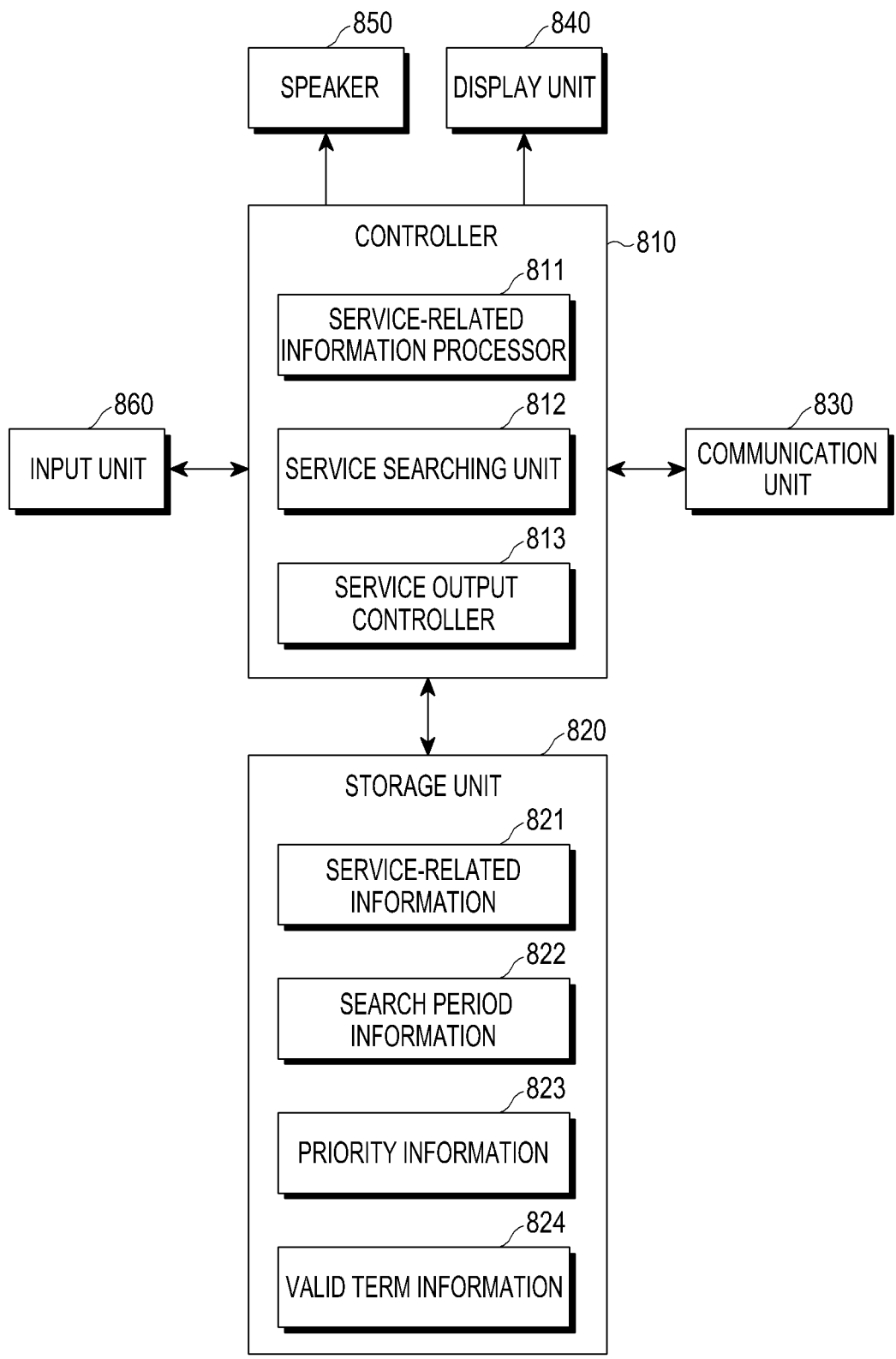
FIG. 8 is a block diagram illustrating an example of a configuration of an electronic device according to an embodiment of the present disclosure.

FIG. 8 is a block diagram illustrating an example of a configuration of an electronic device according to an embodiment of the present disclosure.

Referring to FIG. 8, according to an embodiment of the present disclosure, the electronic device may include at least one of a controller 810, a storage unit 820, a communication unit 830, a display unit 840, a speaker 850, or an input unit 860.

The controller 810 may include at least one of a service-related information processor 811, a service searching unit 812, or a service output controller 813. According to an embodiment of the present disclosure, when receiving a first service or a second service corresponding to the first service through the communication unit 830, the service output controller 813 may perform control so that the received service may be output in various forms depending on the type of the received service.

For example, when the received service (e.g., the first service or second service) is a video, the service output controller 813 may output the voice of the received service through the speaker 850 and the image through the display unit 840. The display unit 840 and/or the speaker 850 may be denoted as an output unit for convenience. The output unit may include any component that may output various types of services, as well as the display unit 840 and speaker 850.

The service-related information processor 811, while the electronic device outputs the first service through the output unit or after the output of the first service is terminated or paused, may collect information related to the first service. Collected service-related information 821 may be stored in the storage unit 820. A request for the first service-related information may be sent to an external server or other electronic device through the communication unit 830 and the first service-related information may be collected, or the first service-related information may be generated in the electronic device as the first service is received.

For example, the service-related information 821 may include at least one of identification (ID) information on the first service, tag information included in the first service, meta information on the first service, location information related to the first service, additional information on the first service, start time information on the first service, end time information on the first service, information on a time duration during which the first service is provided, information on the time when the first service is paused, or valid term information on the first service. For example, according to an embodiment of the present disclosure, when the first service is a broadcast service, the service-related information may include at least one of channel information on the broadcast, a broadcast name, a broadcast start time, a broadcast end time, additional information related to the broadcast, broadcast station information, or rebroadcast information on the broadcast.

When the provision of the first service is terminated or paused due to various factors, such as an environmental variation in the server providing the first service, an environmental variation in the user or the electronic device being used, or an environmental variation in the network, the service searching unit 812 of the controller 810 may search the second service corresponding to the first service at the time of the termination or pause of the provision of the first service or after the provision of the first service is terminated or paused (e.g., periodically or at a predetermined time), according to an embodiment of the present disclosure. When the search by the service searching unit 812 is set to be done periodically, search period information 822 stored in the storage unit 820 may be referenced to perform a search. The service searching unit 812, when searching for the second service corresponding to the first service, may reference the service-related information 821 stored in the storage unit 820. For example, the service searching unit 812 may search for the second service corresponding to the first service using at least one of the first service-related information stored in the storage unit 820.

The service output controller 813 may perform control so that the second service searched by the service searching unit 812 may be output through an output unit (e.g., the display unit 840 or speaker 850). When there are a plurality of second services searched by the service searching unit 812, priority information 823 stored in the storage unit 820 may be referenced to output a service with a higher priority as the second service.

The priorities stored as the priority information 823 may be priorities for devices or servers that may provide the second service, a priority for a network (e.g., a mobile communication network or a short-range communication network) providing the second service, a priority for the type of the second service, or a priority for a device to output the second service. For example, according to an embodiment of the present disclosure, when there are a plurality of second services searched by the service searching unit 812, the service output controller 813 may selectively output, depending on the priorities, the second service with a higher priority for the device or server, the second service with a higher priority for the network, the second service with a higher priority for the service type, and the second service with a higher priority for the output device.

Further, according to an embodiment of the present disclosure, the service output controller 813 may identify a valid term for the second service searched by the service searching unit 812. For example, when the second service corresponding to the first service is searched, valid term information 824 stored in the storage unit 820 may be referenced to identify whether the time to output the searched second service is within a predetermined valid term for the first service.

According to an embodiment of the present disclosure, the user may perform a search and output for the first service through the input unit 860. Further, the user may set various relevant information to provide the second service corresponding to the first service through the input unit 860.

Although FIG. 8 shows that the electronic device independently operates in the electronic device, the electronic device may be implemented to have a separate communication interface (not shown) to perform at least some of the functions of the embodiments of the present disclosure by communicating with an external electronic device or server through a network.

For example, according to an embodiment of the present disclosure, the server may support the operation of the electronic device by performing at least one of the operations (or functions) implemented in the electronic device. For example, the server may include at least some components of the controller 810 implemented in the electronic device to perform (or instead perform) at least one of the operations (or functions) performed by the controller 810.

Meanwhile, according to an embodiment of the present disclosure, as used herein, the term "unit" or "module" may denote hardware and a functional or structural combination of software for driving the hardware to implement the technical spirit according to an embodiment of the present disclosure. For example, it should be appreciated by one of ordinary skill in that art that each functional unit or module may be a logical unit of a predetermined code and a hardware resource for executing the code, and the functional unit does not necessarily mean a physically connected code or a type of hardware.

According to an embodiment of the present disclosure, an electronic device may comprise an output unit configured to output a first service provided from a first device and a controller configured to perform control so that when reception of the first service is paused, and a second device providing at least one second service corresponding to the first service is searched, a request for the at least one second service is sent to the second device.

According to an embodiment of the present disclosure, the controller may perform control to store at least one service-related information related to the first service and to search the second service using the stored service-related information.

According to an embodiment of the present disclosure, the service-related information may include at least one of identification information on the first service, tag information included in the first service, meta information on the first service, location information related to the first service, additional information on the first service, start time information on the first service, end time information on the first service, information on a time duration during which the first service is provided, information on the time when the first service is paused, valid term information on the first service, channel information on a broadcast, a broadcast name, a broadcast start time, a broadcast end time, additional information related to the broadcast, broadcast station information, or rebroadcast information on the broadcast.

According to an embodiment of the present disclosure, the second service corresponding to the first service may include the same service as the first service or a service related to the first service.

According to an embodiment of the present disclosure, the second service corresponding to the first service may include at least one of the same video provided from the same source as the first service, a video provided from a different source from the first service and having the same content but a different format, at least one additional information related to the video, or information related to information included in the video.

According to an embodiment of the present disclosure, the controller may, when there are a plurality of searched second services, select at least one second service to be output depending on a predetermined priority.

According to an embodiment of the present disclosure, the priority may include at least one of a priority for a device or a server that may provide the second service, a priority for a network providing the second service, and a priority for a type of the second service.

According to an embodiment of the present disclosure, the controller may perform a search depending on a predetermined search period.

According to an embodiment of the present disclosure, the second service may be set considering at least one of a predetermined value, a value set by a user, a remaining battery time of the electronic device, motion information on the electronic device, and an importance of the second service.

According to an embodiment of the present disclosure, the controller may determine a device to output the second service.

Hereinafter, procedures for providing a service from an electronic device according to embodiments of the present disclosure are described with reference to FIGS. 9, 10, 11, 12, 13, 14, 15, and 16.

Figure 9:
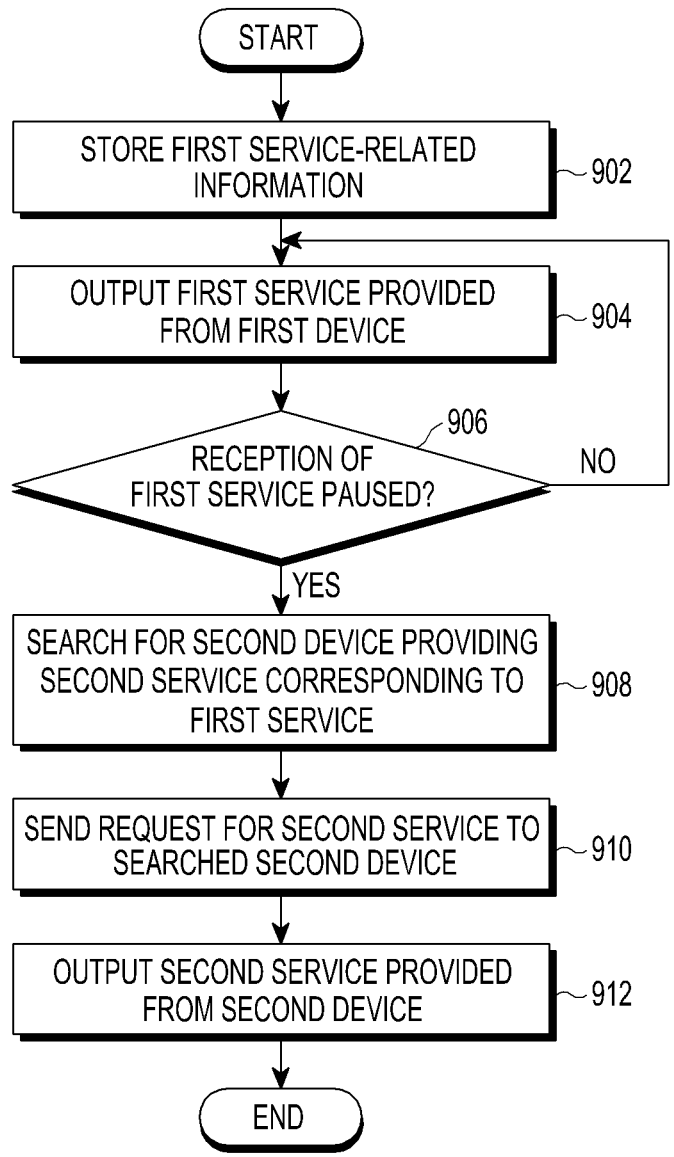
FIG. 9 is a flowchart illustrating a service output procedure in an electronic device according to an embodiment of the present disclosure.

FIG. 9 is a flowchart illustrating a service output procedure in an electronic device according to an embodiment of the present disclosure.

Referring to FIG. 9, in operation 902, first service-related information may be stored. In operation 904, a first service provided from a first device may be output. The storage of the first service-related information may be performed any time before the first service is output, while the first service is output, or after the first service is output.

As described above, when various types of the first service are provided, the provision of the services may be terminated or paused due to a diversity of factors, such as an environmental variation in the server providing the first service, an environmental variation in the user or the electronic device being used by the user, or an environmental variation in the network.

According to an embodiment of the present disclosure, when the provision of the first service is terminated or paused in operation 906, the electronic device, in operation 908, may search for at least one second service corresponding to the first service at the time that the first service is terminated or paused or after the first service is terminated or paused. As described above, the second service corresponding to the first service may include the same service as the first service or a service related to the first service.

As a result of the search, when the second device 112 is searched as a device providing the second service corresponding to the first service, the electronic device may send a request for the second service to the second device in operation 910. The second device may provide the second service to the electronic device in response to the request from the electronic device. In operation 912, the electronic device may output the second service provided from the second device.

Figure 10:
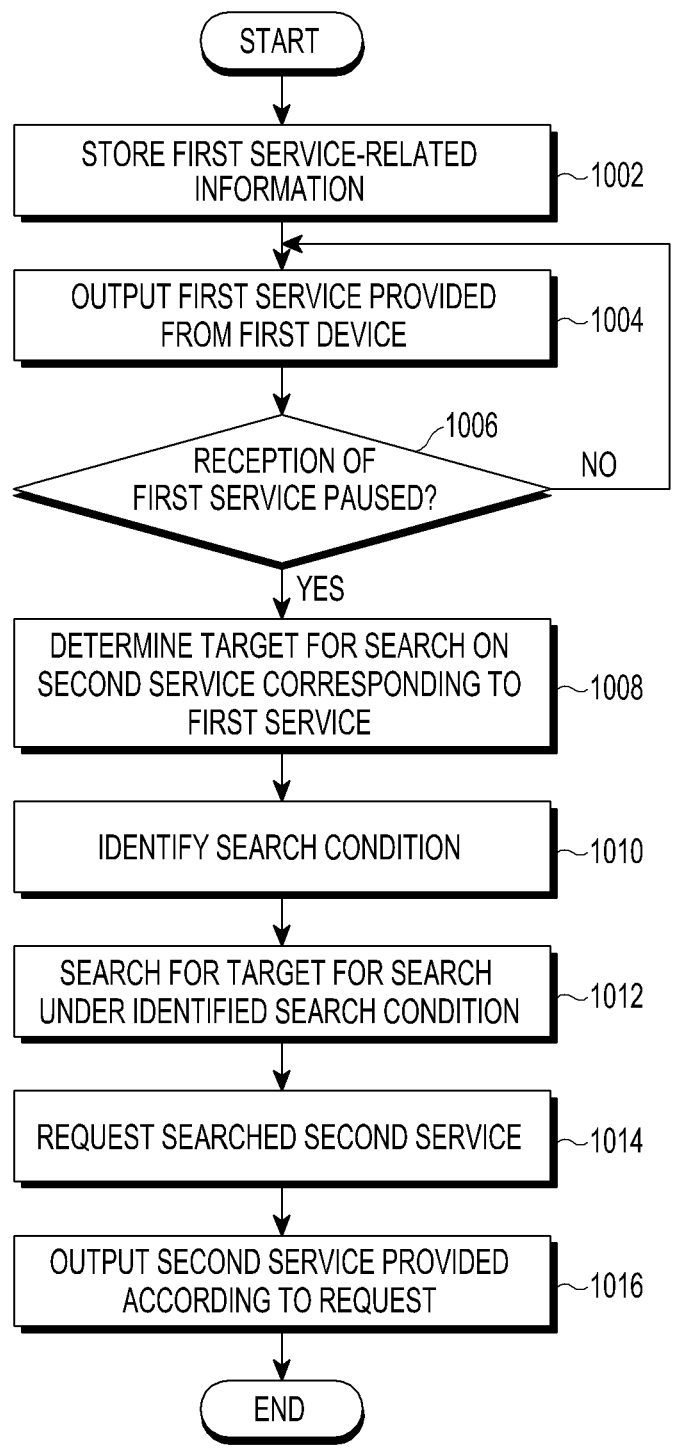
FIG. 10 is a flowchart illustrating a service output procedure in an electronic device according to an embodiment of the present disclosure.

FIG. 10 is a flowchart illustrating a service output procedure in an electronic device according to an embodiment of the present disclosure.

Referring to FIG. 10, in operation 1002, first service-related information may be stored. In operation 1004, a first service provided from a first device may be output. The storage of the first service-related information may be performed any time before the first service is output, while the first service is output, or after the first service is output.

As described above, when various types of the first service are provided, the provision of the services may be terminated or paused due to a diversity of factors, such as an environmental variation in the server providing the first service, an environmental variation in the user or the electronic device being used by the user, or an environmental variation in the network.

In operation 1006, when the provision of the first service is terminated or paused, according to an embodiment of the present disclosure, the electronic device, in operation 1008, may determine a target for search for the second service corresponding to the first service. The target for search may be determined depending on the type of the service to be provided. For example, whether the second service to be searched is a service of the same type as the first service, a service including additional information in addition to the same type of service as the first service, a service providing additional information for the first service, or a service similar in type to the first service may be determined.

In operation 1010, the electronic device may identify a search condition for the second service. The search condition may include at least one of a service by the user's selection, a service within a predetermined time after the service is paused, and a service currently going on after the service is paused. For example, when the search for the second service is complete, filtering may be done with the search condition, and control may be fulfilled so that only the second service meeting the search condition is output.

In operation 1012, the electronic device may search for the determined target for search depending on the identified search condition. In operation 1014, the electronic device may request the searched second service. According to an embodiment of the present disclosure, when there are a plurality of searched second services, an implementation may be made so that a second service with the highest priority depending on predetermined priorities is requested. In operation 1016, the electronic device may output the second service provided in response to the request.

Figure 11:
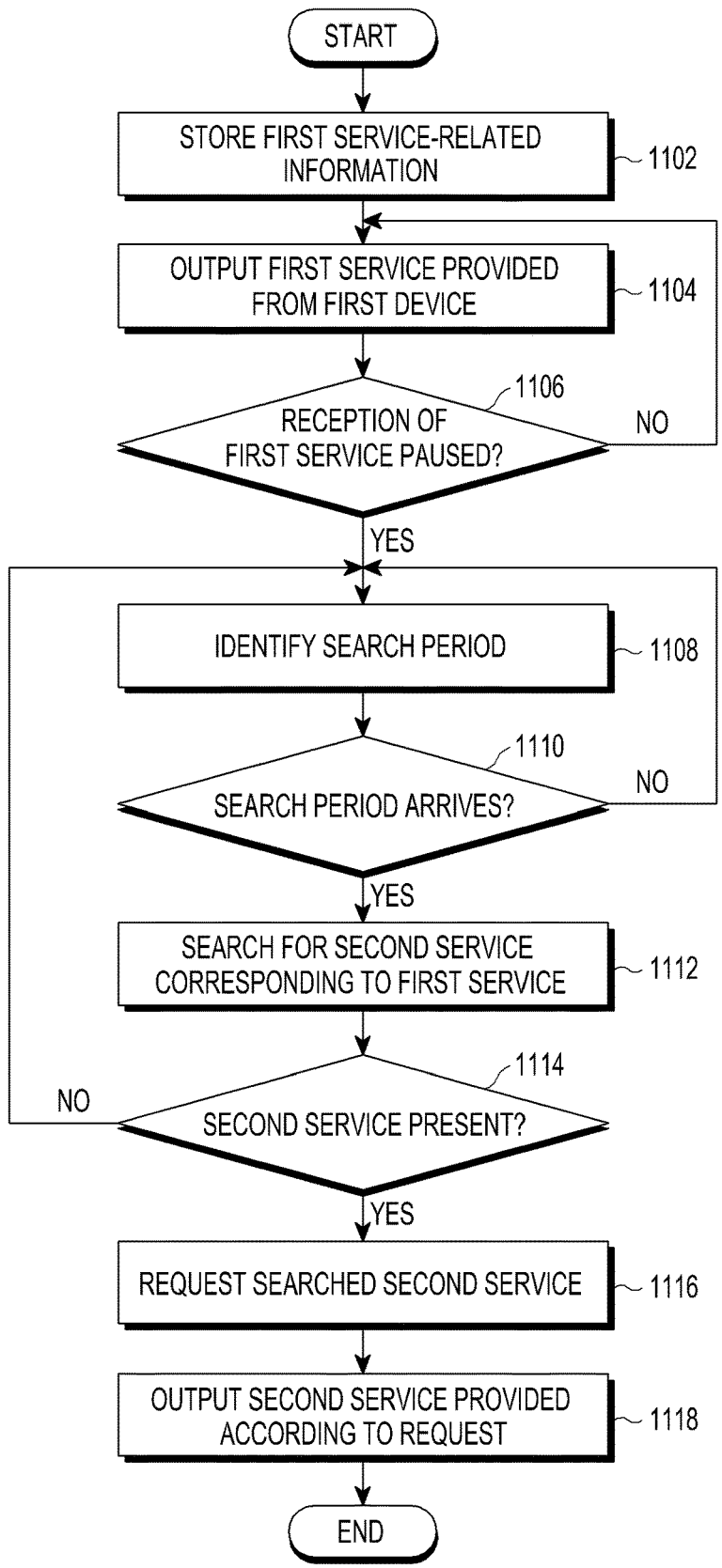
FIG. 11 is a flowchart illustrating a service output procedure in an electronic device according to an embodiment of the present disclosure.

FIG. 11 is a flowchart illustrating a service output procedure in an electronic device according to an embodiment of the present disclosure.

Referring to FIG. 11, in operation 1102, first service-related information may be stored. In operation 1104, a first service provided from a first device may be output. The storage of the first service-related information may be performed any time before the first service is output, while the first service is output, or after the first service is output.

As described above, when various types of the first service are provided, the provision of the services may be terminated or paused due to a diversity of factors, such as an environmental variation in the server providing the first service, an environmental variation in the user or the electronic device being used by the user, or an environmental variation in the network.

In operation 1106, when the provision of the first service is terminated or paused, according to an embodiment of the present disclosure, the electronic device, in operation 1108, may identify a period of search for the second service corresponding to the first service. The search period may be a predetermined value or may be set by the user. Further, the search period may be set corresponding to the first service provided. Further, according to an embodiment of the present disclosure, the search period may be set considering the remaining battery time, motion information on the electronic device, and importance of the service.

As a result of the identification, when the search period arrives in operation 1110, the second service corresponding to the first service may be searched in operation 1112. As a result of the search, when there is at least one second service in operation 1114, the searched second service may be requested in operation 1116. In operation 1118, the electronic device may output the second service provided in response to the request.

Figure 12:
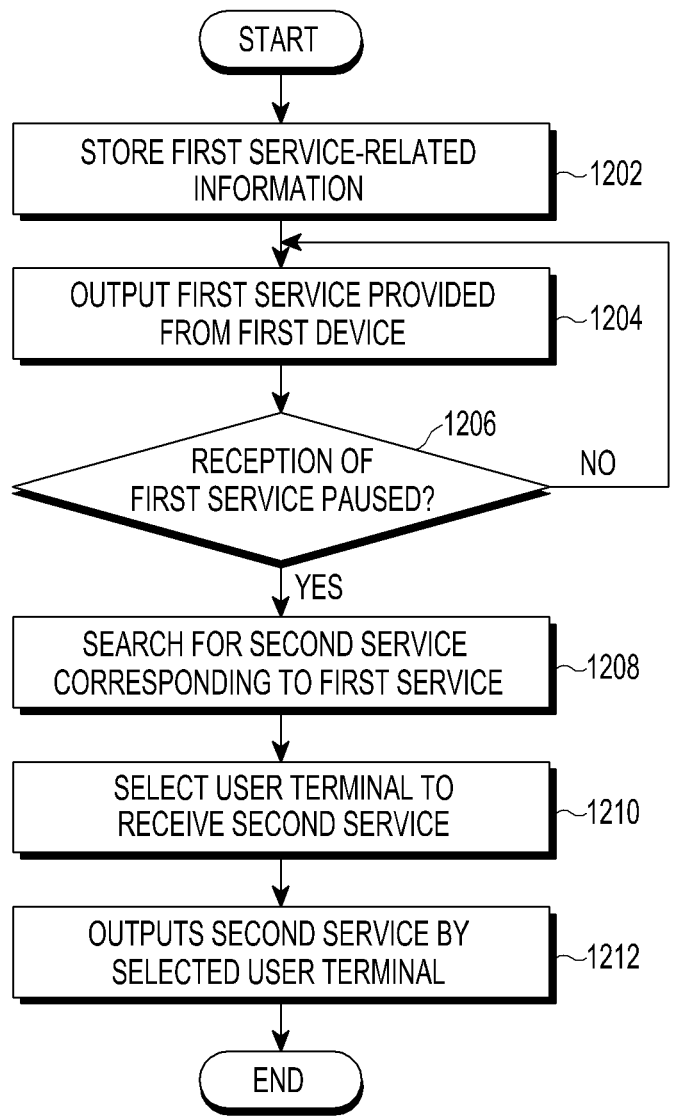
FIG. 12 is a flowchart illustrating a service output procedure in an electronic device according to an embodiment of the present disclosure.

FIG. 12 is a flowchart illustrating a service output procedure in an electronic device according to an embodiment of the present disclosure.

Referring to FIG. 12, in operation 1202, first service-related information may be stored. In operation 1204, a first service provided from a first device may be output. The storage of the first service-related information may be performed any time before the first service is output, while the first service is output, or after the first service is output.

As described above, when various types of the first service are provided, the provision of the services may be terminated or paused due to a diversity of factors, such as an environmental variation in the server providing the first service, an environmental variation in the user or the electronic device being used by the user, or an environmental variation in the network.

According to an embodiment of the present disclosure, when the provision of the first service is terminated or paused in operation 1206, the electronic device, in operation 1208, may search for at least one second service corresponding to the first service at the time that the first service is terminated or paused or after the first service is terminated or paused. As described above, the second service corresponding to the first service may include the same service as the first service or a service related to the first service.

In operation 1210, the electronic device may select a user terminal to receive the searched second service. The selection of the user terminal to receive the second service may be performed according to the user's settings or a preselected priority. For example, the device to output the second service may be selected from the smartphone and wearable device possessed by the user, and when the user rides in a vehicle, the electronic device installed in the vehicle may be selected as the output device. In operation 1212, the searched second service may be output from the selected user terminal.

Figure 13:
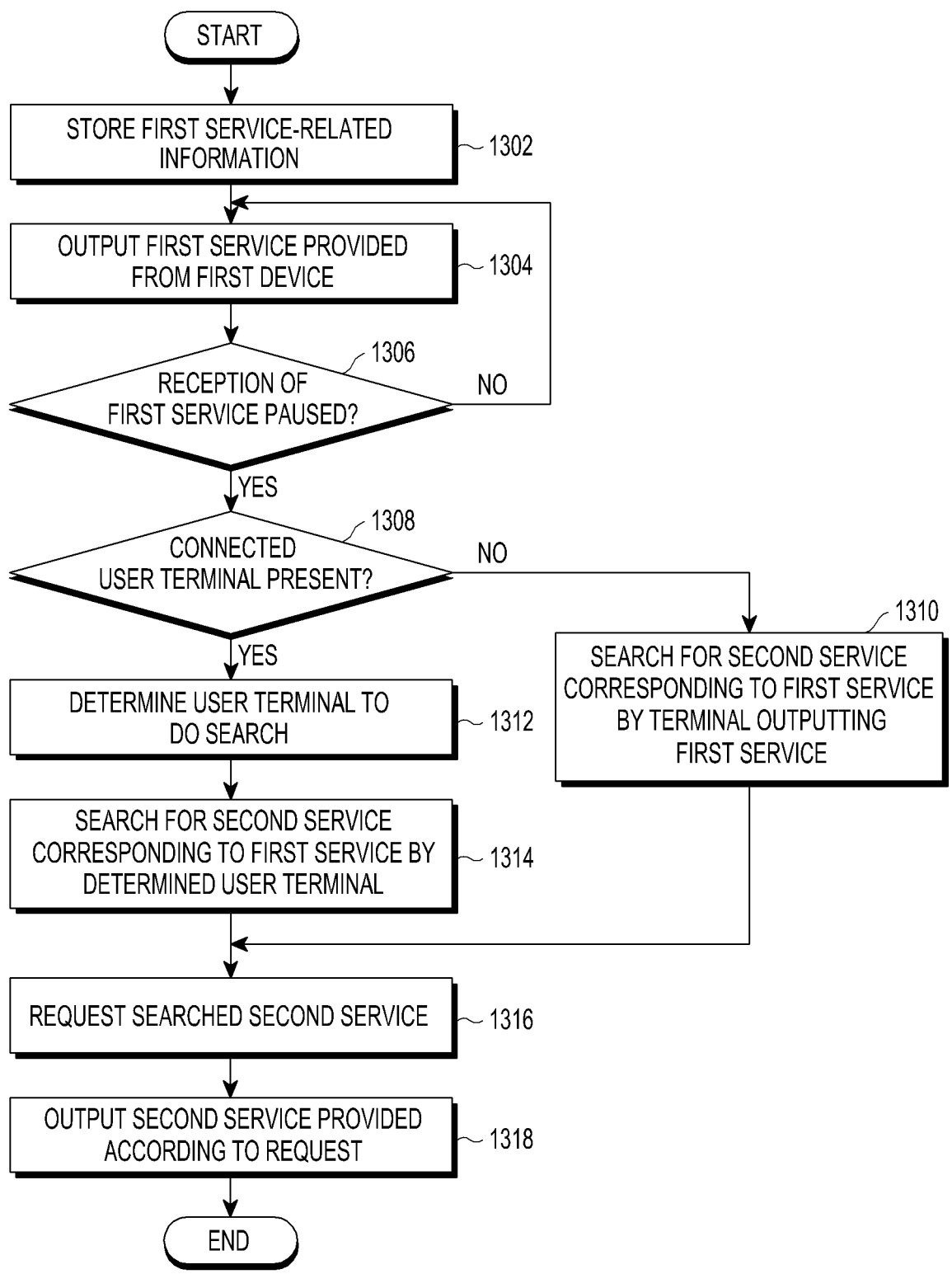
FIG. 13 is a flowchart illustrating a service output procedure in an electronic device according to an embodiment of the present disclosure.

FIG. 13 is a flowchart illustrating a service output procedure in an electronic device according to an embodiment of the present disclosure.

Referring to FIG. 13, in operation 1302, first service-related information may be stored. In operation 1304, a first service provided from a first device may be output. The storage of the first service-related information may be performed any time before the first service is output, while the first service is output, or after the first service is output.

As described above, when various types of the first service are provided, the provision of the services may be terminated or paused due to a diversity of factors, such as an environmental variation in the server providing the first service, an environmental variation in the user or the electronic device being used by the user, or an environmental variation in the network.

According to an embodiment of the present disclosure, when the provision of the first service is terminated or paused in operation 1306, the electronic device may search for at least one second service corresponding to the first service at the time that the first service is terminated or paused or after the first service is terminated or paused. As described above, the second service corresponding to the first service may include the same service as the first service or a service related to the first service.

In operation 1308, the electronic device may identify whether there is a user terminal connected therewith. As a result of the identification, when there is no user terminal connected with the electronic device, the user terminal outputting the first service may search for the second service corresponding to the first service in operation 1310.

As a result of the identification, when there is at least one user terminal connected with the electronic device, a user terminal to do search may be determined in operation 1312. In operation 1314, the determined user terminal may search for the second service corresponding to the first service. As a result of the search, when there is at least one second service, the searched second service may be requested in operation 1316. In operation 1318, the electronic device may output the second service provided in response to the request.

Figure 14:
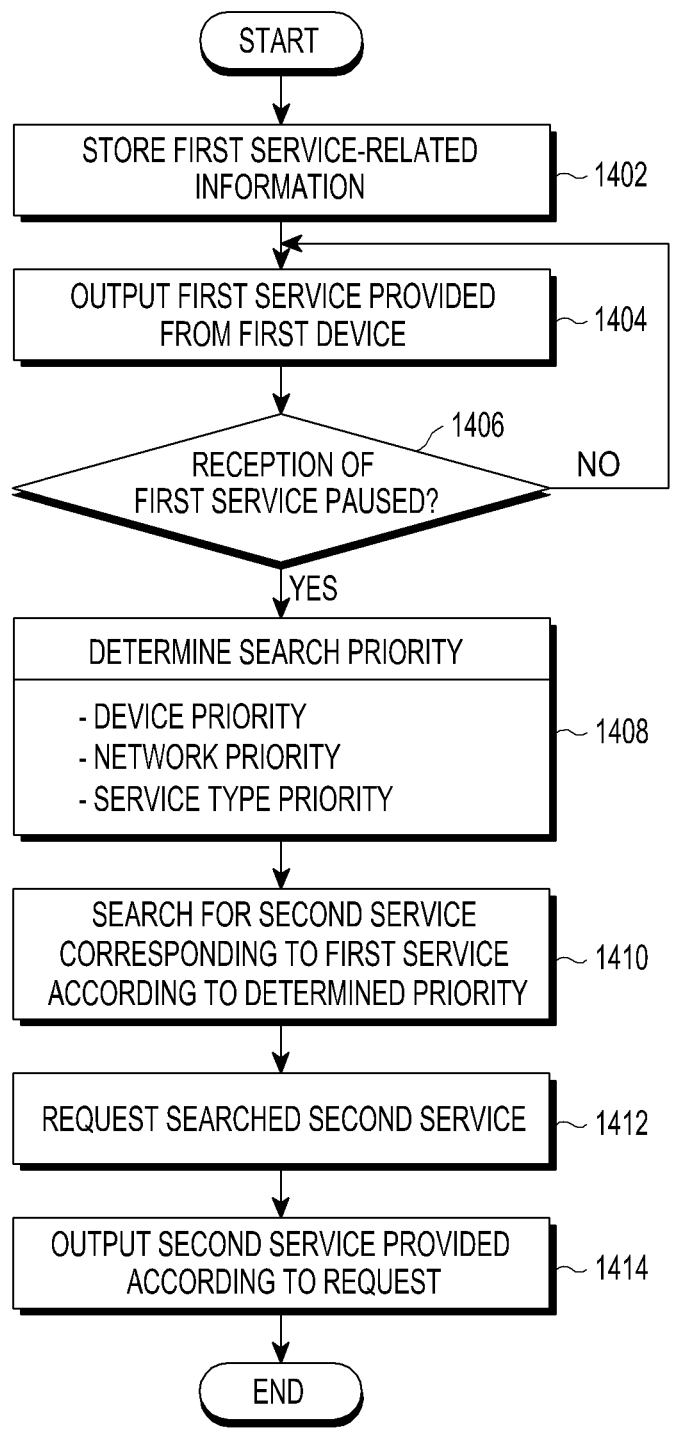
FIG. 14 is a flowchart illustrating a service output procedure in an electronic device according to an embodiment of the present disclosure.

FIG. 14 is a flowchart illustrating a service output procedure in an electronic device according to an embodiment of the present disclosure.

Referring to FIG. 14, in operation 1402, first service-related information may be stored. In operation 1404, a first service provided from a first device may be output. The storage of the first service-related information may be performed any time before the first service is output, while the first service is output, or after the first service is output.

As described above, when various types of the first service are provided, the provision of the services may be terminated or paused due to a diversity of factors, such as an environmental variation in the server providing the first service, an environmental variation in the user or the electronic device being used by the user, or an environmental variation in the network.

According to an embodiment of the present disclosure, when the provision of the first service is terminated or paused in operation 1406, the electronic device may search for at least one second service corresponding to the first service at the time that the first service is terminated or paused or after the first service is terminated or paused. As described above, the second service corresponding to the first service may include the same service as the first service or a service related to the first service.

In operation 1408, the electronic device may determine a search priority. The search priority may include at least one of a device priority, a network priority, and a service priority. The search priority may be set while the first service is received or before the first service is received. Further, the search priority may be determined depending on the provided first service.

In operation 1410, the second service corresponding to the first service may be determined depending on the determined priority. As a result of the search, when there is at least one second service, the searched second service may be requested in operation 1412. In operation 1414, the electronic device may output the second service provided in response to the request.

Figure 15:
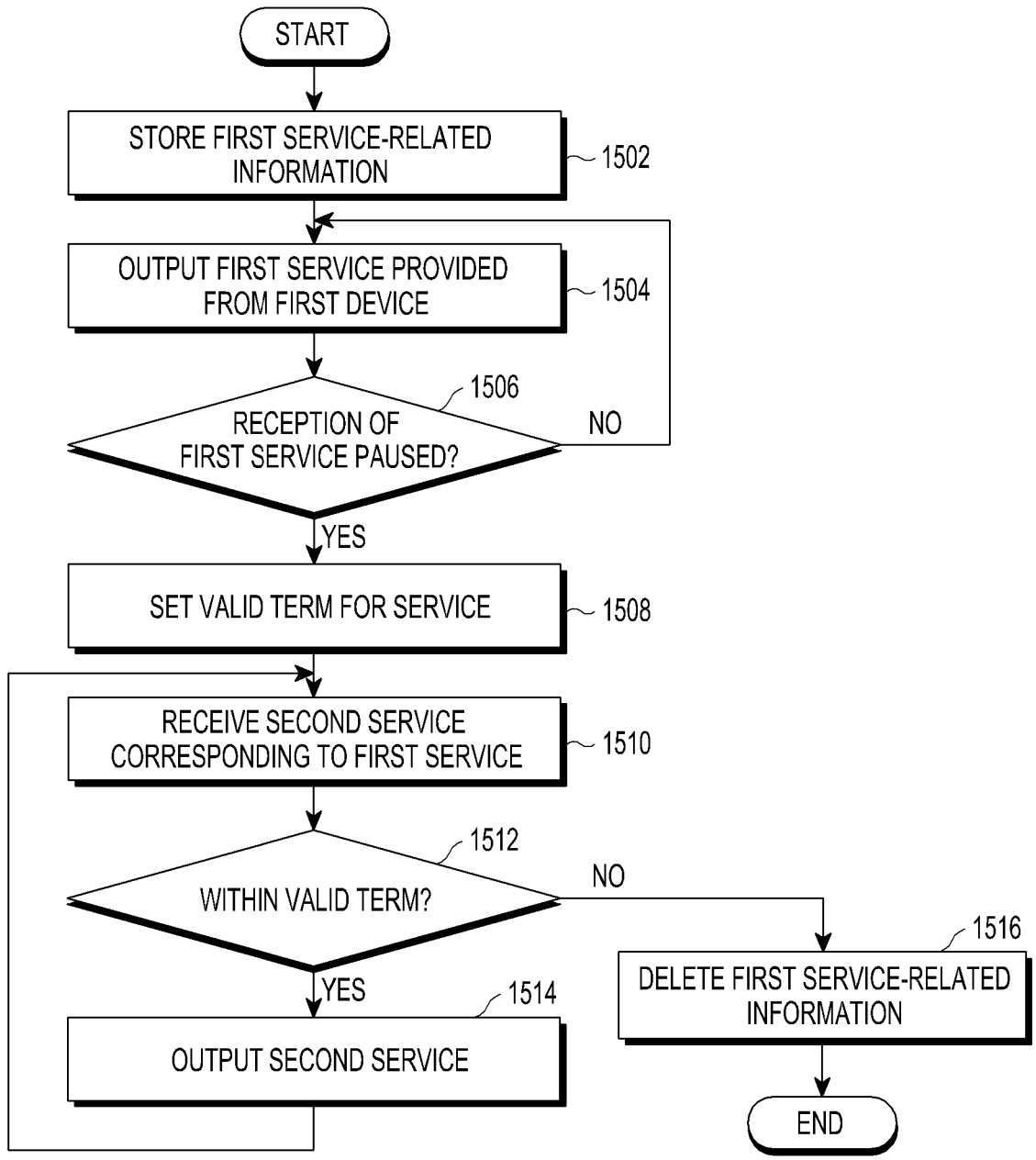
FIG. 15 is a flowchart illustrating a service output procedure in an electronic device according to an embodiment of the present disclosure.

FIG. 15 is a flowchart illustrating a service output procedure in an electronic device according to an embodiment of the present disclosure.

Referring to FIG. 15, in operation 1502, first service-related information may be stored. In operation 1504, a first service provided from a first device may be output. The storage of the first service-related information may be performed any time before the first service is output, while the first service is output, or after the first service is output.

As described above, when various types of the first service are provided, the provision of the services may be terminated or paused due to a diversity of factors, such as an environmental variation in the server providing the first service, an environmental variation in the user or the electronic device being used by the user, or an environmental variation in the network.

According to an embodiment of the present disclosure, when the provision of the first service is terminated or paused in operation 1506, the electronic device may search for at least one second service corresponding to the first service at the time that the first service is terminated or paused or after the first service is terminated or paused. As described above, the second service corresponding to the first service may include the same service as the first service or a service related to the first service.

In operation 1508, the electronic device may set a service valid term. The service valid term may be a preset value or may be determined by the first service. For example, when the first service is baseball game broadcast, the time when the broadcast baseball game is terminated may be the valid term. Further, when the first service is a drama broadcast, for example, the time when the drama broadcast is terminated may be the valid term. Further, when the first service is a home shopping broadcast, for example, the sale period or discount period of the product broadcast of the home shopping may be the valid term, and a predetermined time (e.g., one month after the broadcast) may be set to the valid term.

As a result of the search on the second service corresponding to the first service in operation 1508, when at least one second service is received in operation 1510, it may be determined in operation 1512 whether the time of reception of the second service is within the set valid term.

As a result of the determination, when the time of reception of the second service is within the valid term, the received second service may be output in operation 1514. As a result of the determination, when the time of reception of the second service is out of the valid term, the received second service might not be output in operation 1516. According to an embodiment of the present disclosure, when the valid term passes, the first service-related information stored in the storage unit may be deleted so that the second service corresponding to the first service is not searched any longer in the future.

Figure 16:
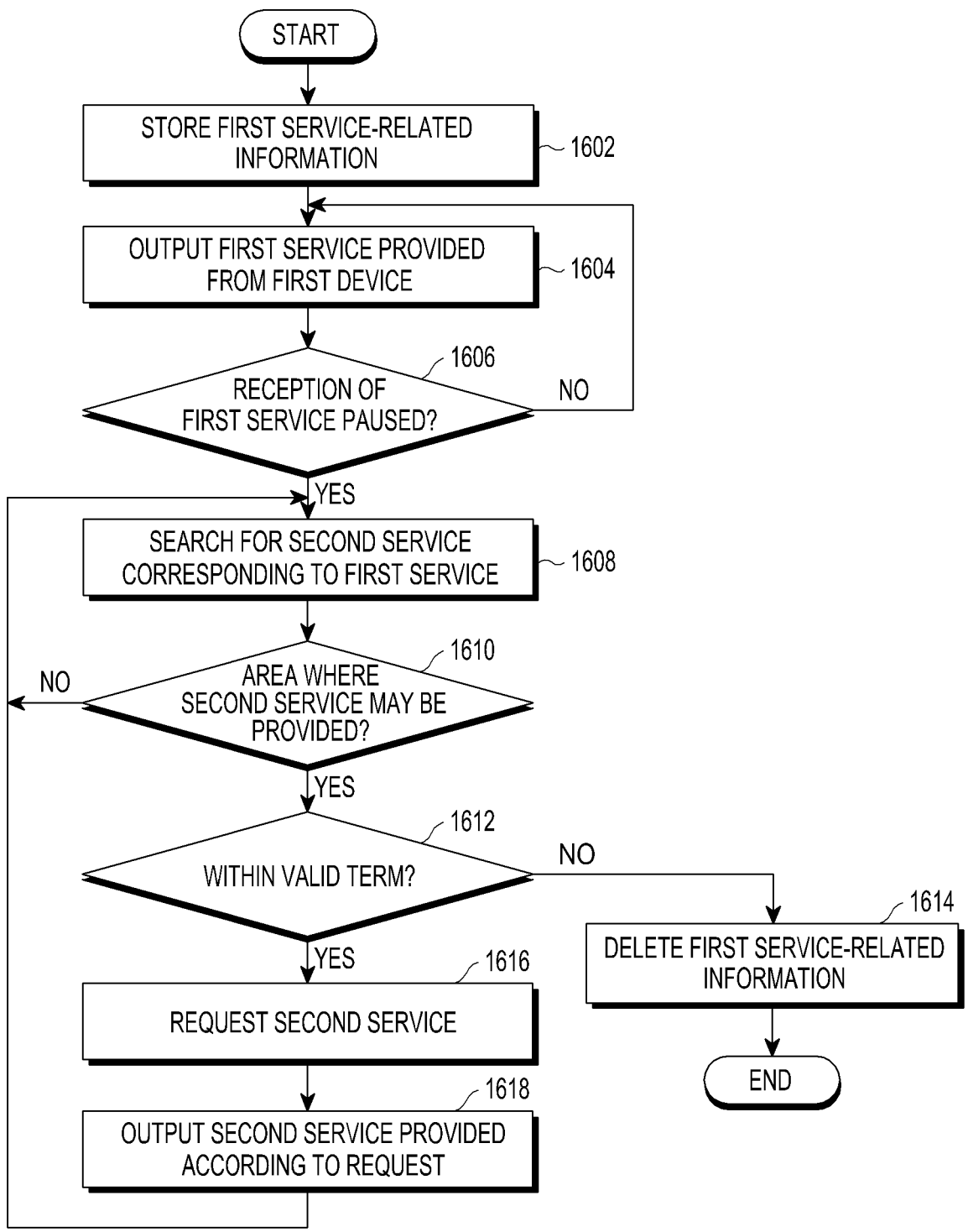
FIG. 16 is a flowchart illustrating a service output procedure in an electronic device according to an embodiment of the present disclosure.

FIG. 16 is a flowchart illustrating a service output procedure in an electronic device according to an embodiment of the present disclosure.

Referring to FIG. 16, in operation 1602, first service-related information may be stored. In operation 1604, a first service provided from a first device may be output. The storage of the first service-related information may be performed any time before the first service is output, while the first service is output, or after the first service is output.

As described above, when various types of the first service are provided, the provision of the services may be terminated or paused due to a diversity of factors, such as an environmental variation in the server providing the first service, an environmental variation in the user or the electronic device being used by the user, or an environmental variation in the network.

According to an embodiment of the present disclosure, when the provision of the first service is terminated or paused in operation 1606, the electronic device may search for at least one second service corresponding to the first service at the time that the first service is terminated or paused or after the first service is terminated or paused. As described above, the second service corresponding to the first service may include the same service as the first service or a service related to the first service.

In operation 1608, the electronic device may search for the second service corresponding to the first service. In operation 1610, as a result of the search, when coming within an area where the provision of the second service is possible, the searched second service may be requested in operation 1616.

Further, according to an embodiment of the present disclosure, it may be determined in operation 1612 whether the time when the second service is searched is within the set valid term. As a result of the determination, when the time when the second service is searched is not within the valid term, the first service information may be deleted in operation 1614.

On the other hand, as a result of the determination, when the time when the second service is searched is within the valid term, the searched second service may be requested in operation 1616. In operation 1618, the electronic device may output the second service provided in response to the request.

According to an embodiment of the present disclosure, at least one of the operations shown in FIGS. 9 to 16 may be omitted, and at least one other operation may be added between the operations. The operations shown in FIGS. 9 to 16 may be processed in the order as shown or in different orders.

According to an embodiment of the present disclosure, a method for providing a service by an electronic device may comprise outputting a first service provided from a first device, when reception of the first service is paused, searching for a second device providing at least one second service corresponding to the first service, and sending a request for the at least one second service to the second device.

According to an embodiment of the present disclosure, the searching may include storing at least one service-related information related to the first service and searching the second service using the stored service-related information.

According to an embodiment of the present disclosure, the service-related information may include at least one of identification information on the first service, tag information included in the first service, meta information on the first service, location information related to the first service, additional information on the first service, start time information on the first service, end time information on the first service, information on a time duration during which the first service is provided, information on the time when the first service is paused, valid term information on the first service, channel information on a broadcast, a broadcast name, a broadcast start time, a broadcast end time, additional information related to the broadcast, broadcast station information, or rebroadcast information on the broadcast.

According to an embodiment of the present disclosure, the second service corresponding to the first service may include the same service as the first service or a service related to the first service.

According to an embodiment of the present disclosure, the second service corresponding to the first service may include at least one of the same video provided from the same source as the first service, a video provided from a different source from the first service and having the same content but a different format, at least one additional information related to the video, or information related to information included in the video.

According to an embodiment of the present disclosure, the method may further comprise, when there are a plurality of searched second services, selecting at least one second service to be output depending on a predetermined priority.

According to an embodiment of the present disclosure, the priority may include at least one of a priority for a device or a server that may provide the second service, a priority for a network providing the second service, and a priority for a type of the second service.

According to an embodiment of the present disclosure, the searching may include performing a search depending on a predetermined search period.

According to an embodiment of the present disclosure, the second service may be set considering at least one of a predetermined value, a value set by a user, a remaining battery time of the electronic device, motion information on the electronic device, and an importance of the second service.

According to an embodiment of the present disclosure, the method may further comprise determining a device to output the second service.

Figure 17A:
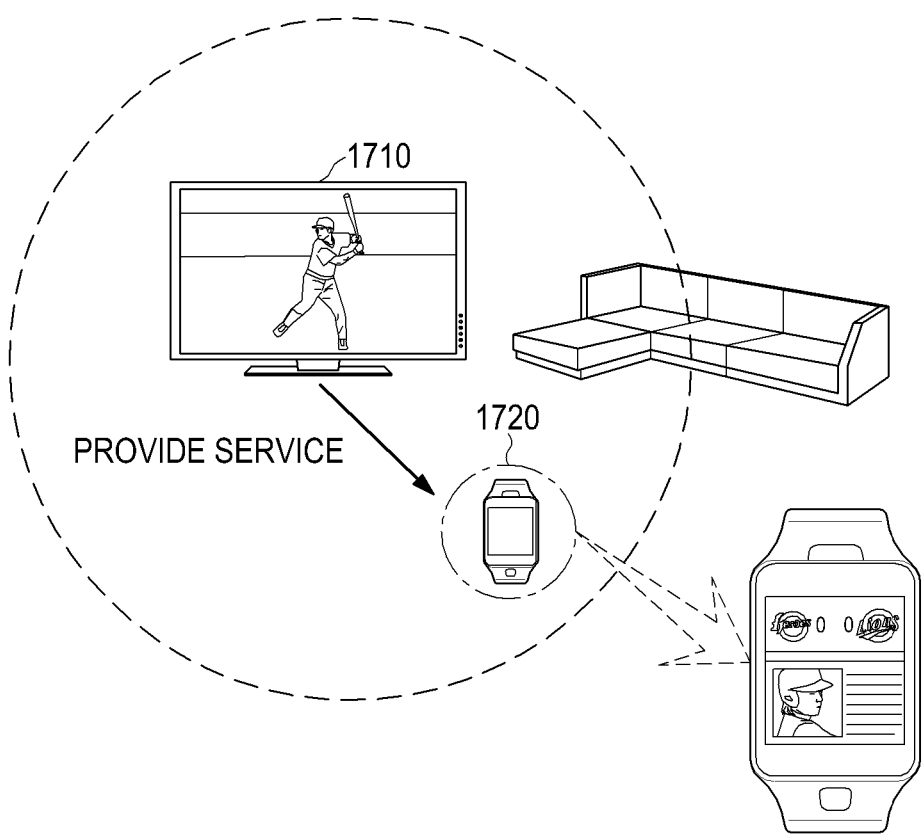
FIG. 17A is a view illustrating an example of a service output procedure in an electronic device according to an embodiment of the present disclosure.
Figure 17B:
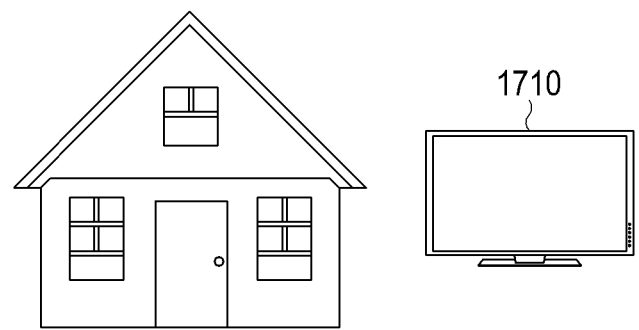
FIG. 17B is a view illustrating an example of a service output procedure in an electronic device according to an embodiment of the present disclosure.
Figure 17B:
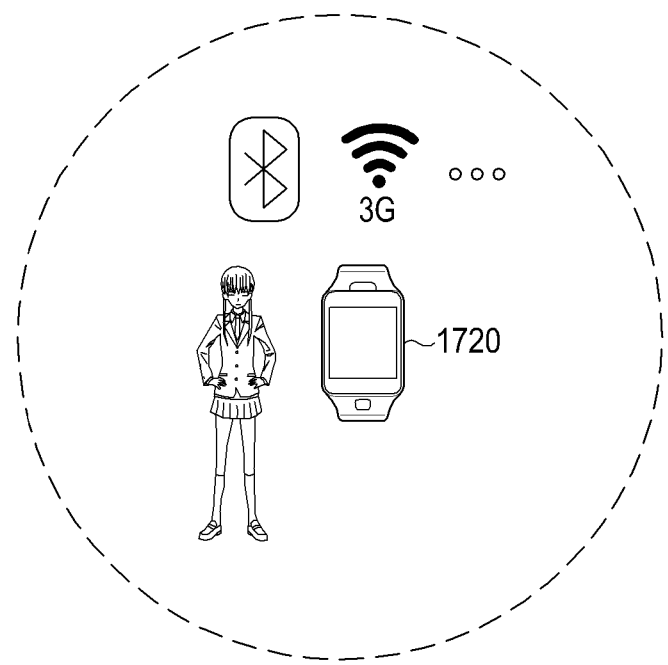
Figure 17C:
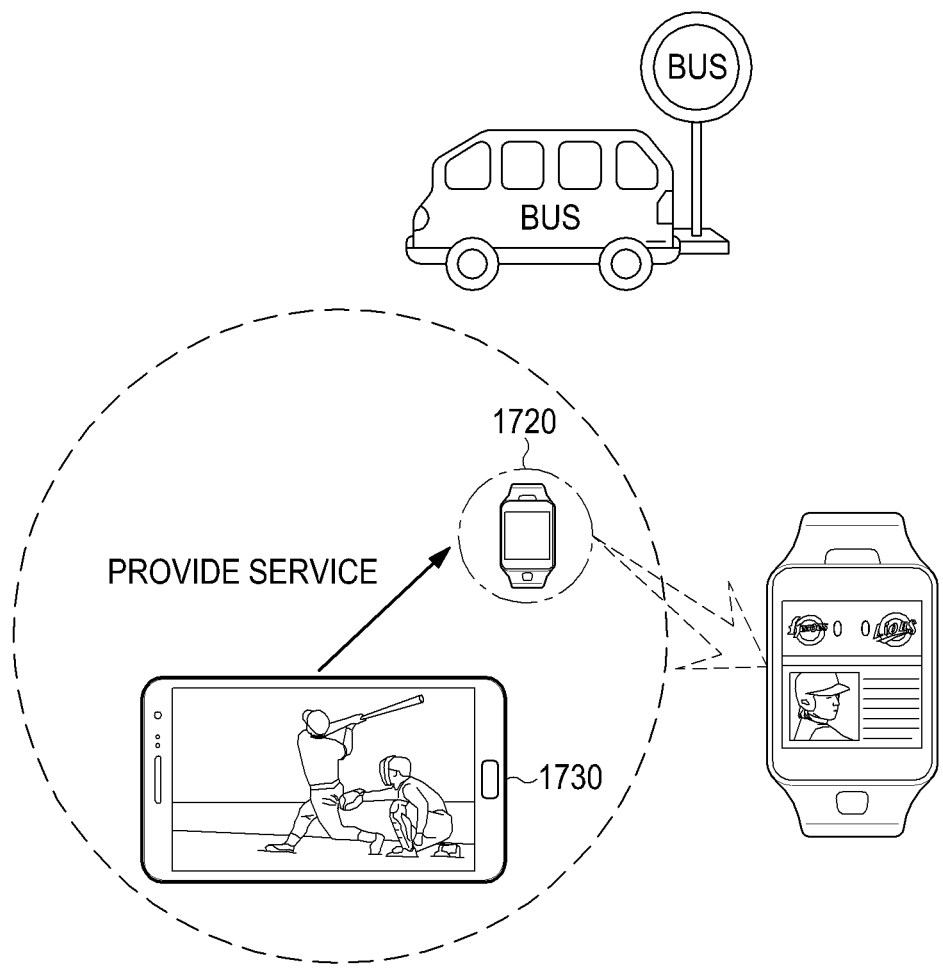
FIG. 17C is a view illustrating an example of a service output procedure in an electronic device according to an embodiment of the present disclosure.

FIGS. 17A to 17C are views illustrating examples of outputting a service in an electronic device according to various embodiments of the present disclosure.

Referring to FIGS. 17A to 17C, a baseball game broadcast-related service (e.g., a first service) may be provided through a TV 1710 by a watch-type wearable device 1720 put on the user.

When the user changes their location while wearing the watch-type wearable device 1720, the watch-type wearable device 1720 stops communication with the TV 1710 and thus cannot receive the first service through the TV 1710 any longer.

Referring to FIG. 17C, according to an embodiment of the present disclosure, the watch-type wearable device 1720 may search for a second service corresponding to the first service, and as a result of the search, may receive the searched second service through the user's smartphone 1730 that is in the user's possession. As described above, the second service may include the same video (e.g., a baseball game broadcast video) provided from the same source as the first service provided through the TV 1710, a video (e.g., a baseball game broadcast video) having the same content but a different format, which is provided from a different source, various additional information (e.g., per-game result information or real-time game information provided as text or an image) related to the video, information (e.g., information related to the baseball game) related to the information included in the video, a combination of the various types of information or a combined type of information.

Figure 18A:
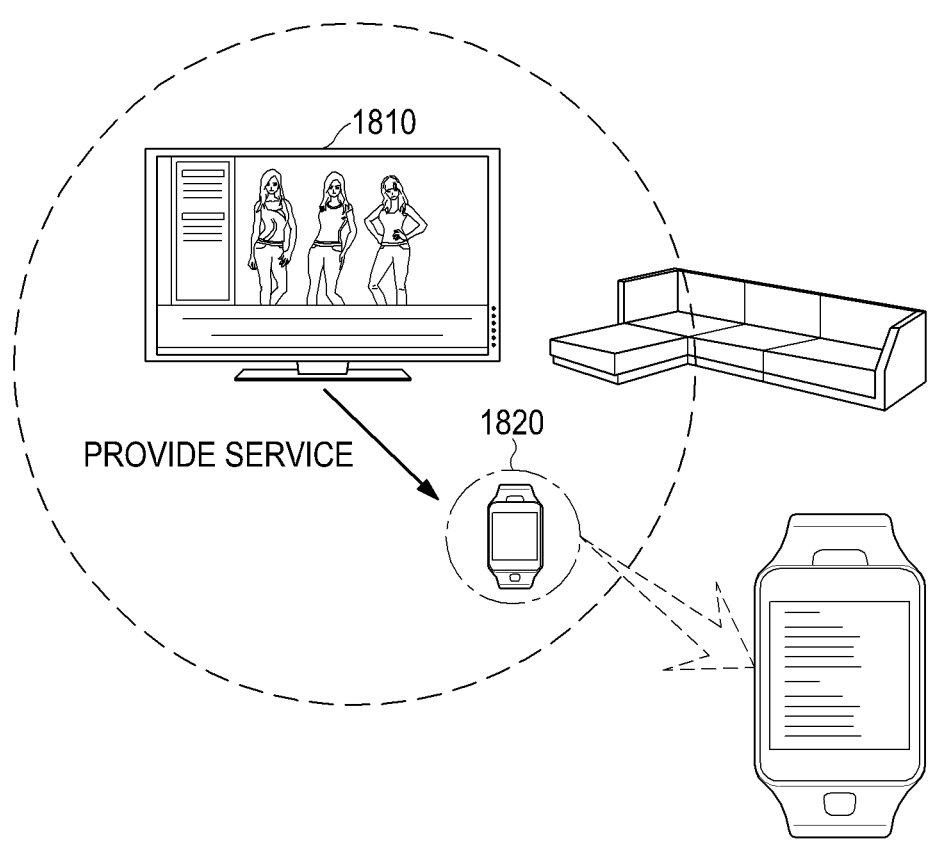
FIG. 18A is a view illustrating an example of a service output procedure in an electronic device according to an embodiment of the present disclosure.
Figure 18B:
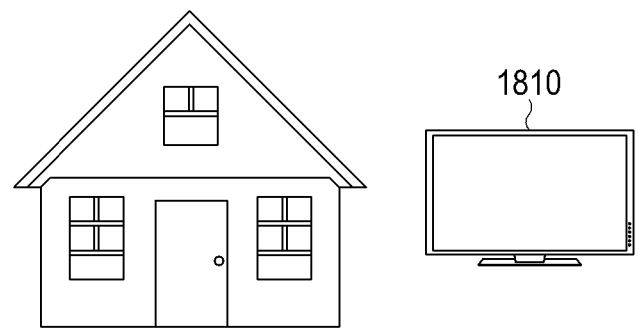
FIG. 18B is a view illustrating an example of a service output procedure in an electronic device according to an embodiment of the present disclosure.
Figure 18B:
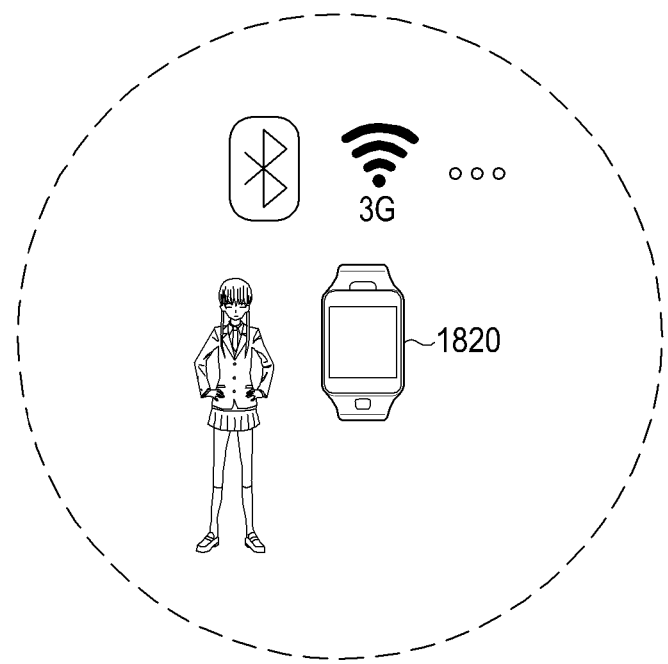
Figure 18C:
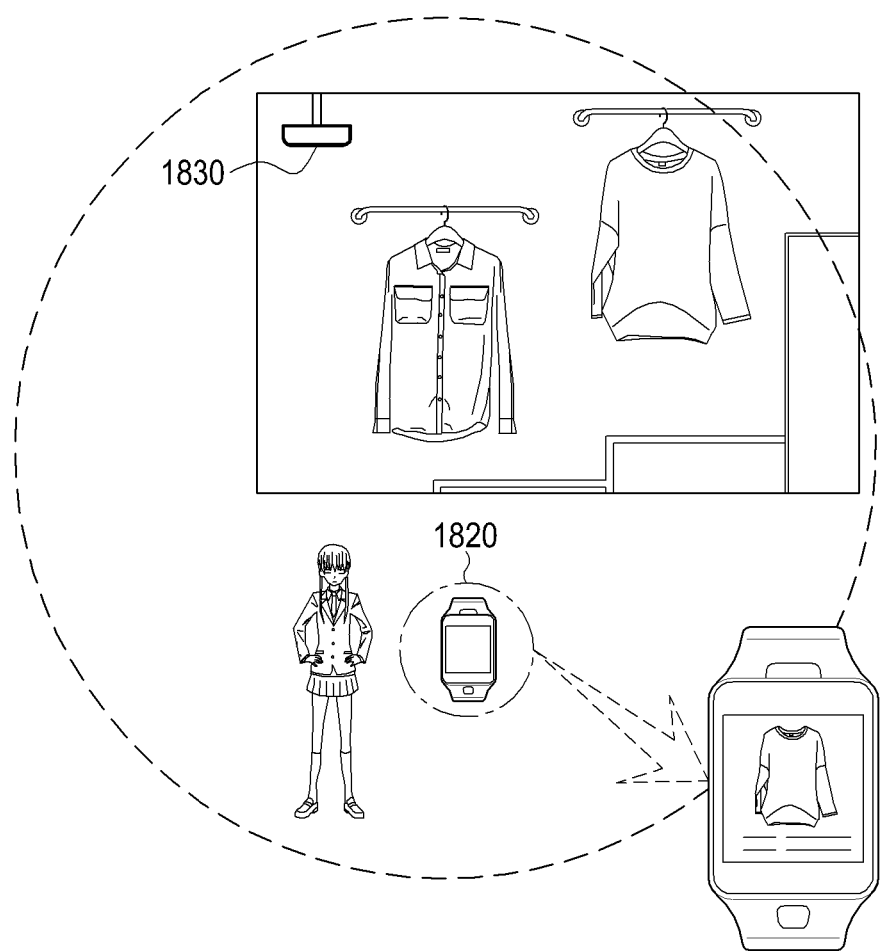
FIG. 18C is a view illustrating an example of a service output procedure in an electronic device according to an embodiment of the present disclosure.

FIGS. 18A to 18C are views illustrating examples of outputting a service in an electronic device according to various embodiments of the present disclosure.

Referring to FIGS. 18A to 18C, a home shopping-related service (e.g., a first service) may be provided through a TV 1810 by a watch-type wearable device 1820 put on the user.

When the user changes their location while wearing the watch-type wearable device 1820, the watch-type wearable device 1820 stops communication with the TV 1810 and thus cannot receive the first service through the TV 1810 any longer. The watch-type wearable device 1820 or the user's smartphone may store the first service-related information and may store valid term setting information on the first service. The first service-related information may include information on a product (e.g., a product called dips on) selected as a product of interest while viewing the home shopping through the TV 1810.

Referring to FIG. 18C, according to an embodiment of the present disclosure, when the user passes by a particular shop, the watch-type wearable device 1820 may receive information (e.g., products-related information (e.g., products discount information)) from an information transmission device 1830 (e.g., an IoT device) installed in the shop.

The watch-type wearable device 1820 may refer to the stored first service-related information to determine whether the product information included in the information received from the information transmission device 1830 corresponds to the first service. As a result of the determination, when the product information contained in the received information corresponds to the first service, the received information may be output (e.g., displayed on the display screen) as the second service.

Further, according to an embodiment of the present disclosure, when the information from the information transmission device 1830 corresponds to the first service but the time of reception of the information from the information transmission device 1830 is out of the valid term, the received information might not be output.

According to an embodiment of the present disclosure, when entering home while receiving outdoors the current state of a home appliance, such as a washer or refrigerator, the wearable device may directly receive the current state from the washer.

According to an embodiment of the present disclosure, when the battery of the smartphone is discharged and thus cannot receive the location information (e.g., corresponding to the first service) any longer, while the wearable device receives and displays the location information from the smartphone, the wearable device may search for a service corresponding to the location information and may receive location information (e.g., corresponding to the second service) through an ambient IoT device.

According to an embodiment of the present disclosure, when the user changes their location while watching TV for major league baseball game broadcast (e.g., corresponding to the first service), if coming within an area that may provide a service (e.g., the second service) corresponding to the major league baseball game broadcast, it may be determined whether the baseball game broadcast is terminated (e.g., identifying the valid term), and if before the baseball game is terminated, the service corresponding to the baseball game broadcast may be requested and received.

According to an embodiment of the present disclosure, when the user watching TV for a soccer game changes their location for other business and comes in an area that may provide the service corresponding to the game, if the game still goes on, the service corresponding to the game may be searched, and the searched service (e.g., game-related text information) may be received.

Figure 19:
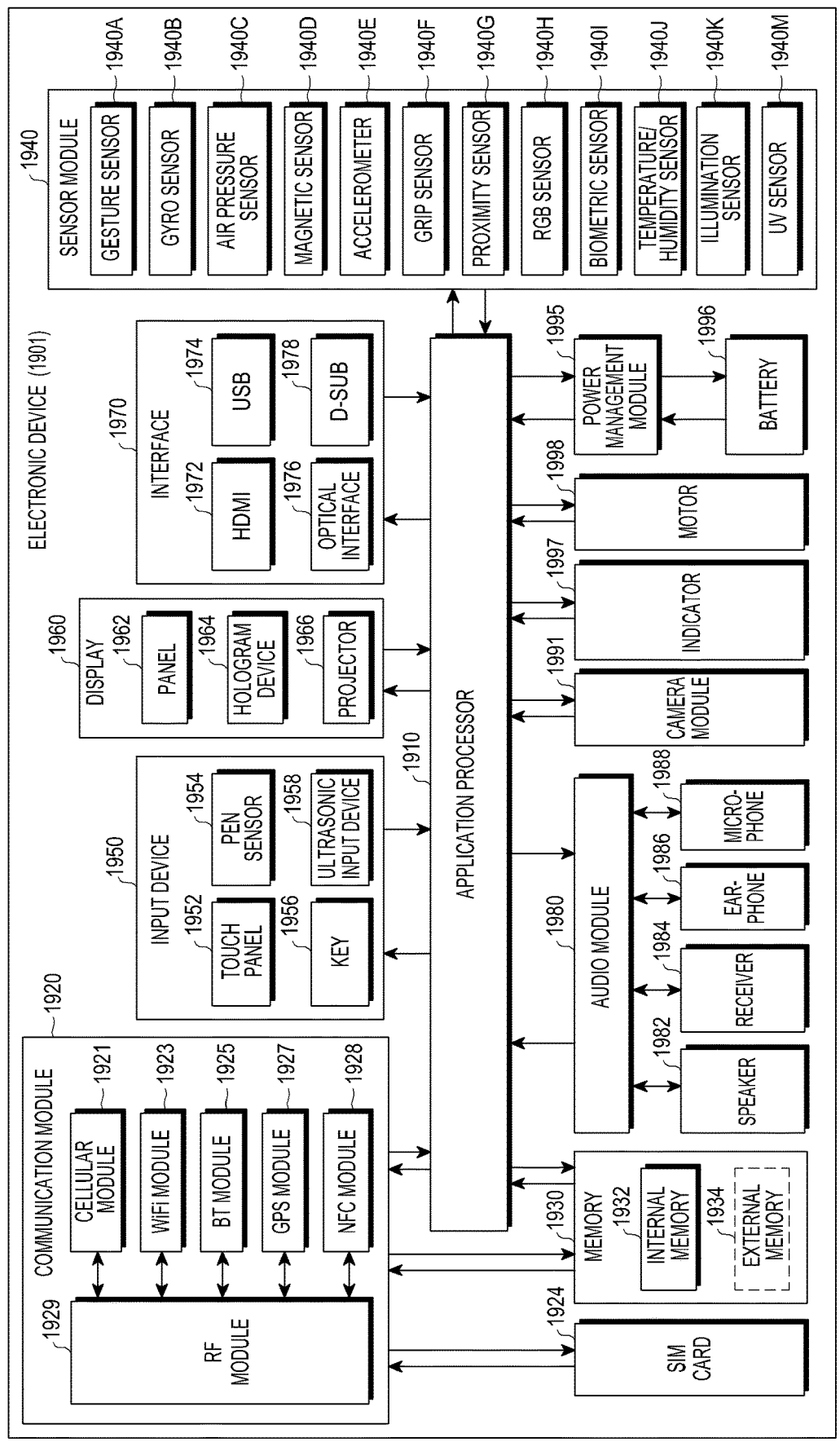
FIG. 19 is a block diagram illustrating a structure of an electronic device according to an embodiment of the present disclosure.

FIG. 19 is a block diagram illustrating a structure of an electronic device according to an embodiment of the present disclosure.

Referring to FIG. 19, the electronic device 1901 may include the whole or part of, e.g., the electronic device shown in FIG. 8. The electronic device 1901 may include one or more APs 1910, a communication module 1920, a subscriber identification module (SIM) card 1924, a memory 1930, a sensor module 1940, an input device 1950, a display 1960, an interface 1970, an audio module 1980, a camera module 1991, a power management module 1995, a battery 1996, an indicator 1997, and a motor 1998.

The AP 1910 may control multiple hardware and software components connected to the AP 1910 by running, e.g., an operating system (OS) or application programs, and the AP 1910 may process and compute various data. The AP 1910 may be implemented in, e.g., a system on chip (SoC). According to an embodiment of the present disclosure, the AP 1910 may further include a graphics processing unit (GPU) and/or an image signal processor. The AP 1910 may include at least some (e.g., the cellular module 1921) of the components shown in FIG. 19. The AP 1910 may load a command or data received from at least one of other components (e.g., a non-volatile memory) on a volatile memory, process the command or data, and store various data in the non-volatile memory.

The communication module 1920 may include, e.g., a cellular module 1921, a Wi-Fi module 1923, a Bluetooth (BT) module 1925, a GPS module 1927, a near field communication (NFC) module 1928, and a radio frequency (RF) module 1929.

The cellular module 1921 may provide voice call, video call, text, or Internet services through a communication network (e.g., a long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM) network). The cellular module 1921 may perform identification or authentication on the electronic device 1901 in the communication network using a SIM (e.g., the SIM card 1924). According to an embodiment of the present disclosure, the cellular module 1921 may perform at least some of the functions providable by the AP 1910. According to an embodiment of the present disclosure, the cellular module 1921 may include a communication processor (CP).

The Wi-Fi module 1923, the BT module 1925, the GPS module 1927, or the NFC module 1928 may include a process for, e.g., processing data communicated through the module. At least some (e.g., two or more) of the cellular module 1921, the Wi-Fi module 1923, the BT module 1925, the GPS module 1927, and the NFC module 1928 may be included in a single integrated circuit (IC) or an IC package.

The RF module 1929 may communicate data, e.g., communication signals (e.g., RF signals). The RF module 1929 may include, e.g., a transceiver, a power amplifier module (PAM), a frequency filter, a low noise amplifier (LNA), or an antenna. According to an embodiment of the present disclosure, at least one of the cellular module 1921, the Wi-Fi module 1923, the BT module 1925, the GPS module 1927, or the NFC module 1928 may communicate RF signals through a separate RF module.

The SIM card 1924 may include, e.g., a card including a SIM and/or an embedded SIM, and may contain unique ID information (e.g., an integrated circuit card identifier (IC-CID) or subscriber information (e.g., an international mobile subscriber identity (IMSI)).

The memory 1930 (e.g., the memory 1930) may include, e.g., an internal memory 1932 or an external memory 1934. The internal memory 1932 may include at least one of, e.g., a volatile memory (e.g., a dynamic random access memory (DRAM), a static RAM (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1934 may include a flash drive, e.g., a compact flash (CF) memory, a secure digital (SD) memory, a micro-SD memory, a mini-SD memory, an extreme digital (xD) memory, or a Memory Stick™. The external memory 1934 may be functionally and/or physically connected with the electronic device 1901 via various interfaces.

For example, the sensor module 1940 may measure a physical quantity or detect an operational state of the electronic device 1901, and the sensor module 940 may convert the measured or detected information into an electrical signal. The sensor module 1940 may include at least one of, e.g., a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H such as an red-green-blue (RGB) sensor, a bio sensor 1940I, a temperature/humidity sensor 1940J, an illumination sensor 1940K, or an ultraviolet (UV) sensor 1940M. Additionally or alternatively, the sensing module 1940 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1940 may further include a control circuit for controlling at least one or more of the sensors included in the sensing module. According to an embodiment of the present disclosure, the electronic device 1901 may further include a processor configured to control the sensor module 1940 as part of an AP 1910 or separately from the AP 1910, and the electronic device 901 may control the sensor module 1940 while the AP is in a sleep mode.

The input unit 1950 may include, e.g., a touch panel 1952, a (digital) pen sensor 1954, a key 1956, or an ultrasonic input device 1958. The touch panel 1952 may use at least one of capacitive, resistive, infrared, or ultrasonic methods. The touch panel 1952 may further include a control circuit. The touch panel 1952 may further include a tactile layer and may provide a user with a tactile reaction.

The (digital) pen sensor 1954 may include, e.g., a part of a touch panel or a separate sheet for recognition. The key 1956 may include e.g., a physical button, optical key or key pad. The ultrasonic input device 1958 may use an input tool that generates an ultrasonic signal and enable the electronic device 1901 to identify data by sensing the ultrasonic signal to a microphone (e.g., a microphone 1988).

The display 1960 (e.g., the display 160) may include a panel 1962, a hologram device 1964, or a projector 1966. The panel 1962 may have the same or similar configuration to the display unit 840 of FIG. 8. The panel 1962 may be implemented to be flexible, transparent, or wearable. The panel 1962 may also be incorporated with the touch panel 1952 in a module. The hologram device 1964 may make three dimensional (3D) images (holograms) in the air by using light interference. The projector 1966 may display an image by projecting light onto a screen. The screen may be, for example, located inside or outside of the electronic device 1901. In accordance with an embodiment, the display 1960 may further include a control circuit to control the panel 1962, the hologram device 1964, or the projector 1966.

The interface 1970 may include e.g., a high definition multimedia interface (HDMI) 1972, a universal serial bus (USB) 1974, an optical interface 1976, or a D-subminiature (D-sub) 1978. Additionally or alternatively, the interface 1970 may include a mobile high-definition link (MHL) interface, an SD card/multimedia card (MMC) interface, or infrared data association (IrDA) standard interface.

The audio module 1980 may convert a sound into an electric signal or vice versa, for example. The audio module 1980 may process sound information input or output through e.g., a speaker 1982, a receiver 1984, an earphone 1986, or a microphone 1988.

For example, the camera module 1991 may be a device for capturing still images and videos, and may include, according to an embodiment of the present disclosure, one or more image sensors (e.g., front and back sensors), a lens, an image signal processor (ISP), or a flash such as a light emitting diode (LED) or xenon lamp.

The power manager module 1995 may manage power of the electronic device 1901, for example. Although not shown, according to an embodiment of the present disclosure, a power management integrated circuit (PMIC), a charger IC, or a battery or fuel gauge is included in the power manager module 1995. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1996, a voltage, a current, or a temperature while the battery 1996 is being charged. The battery 1996 may include, e.g., a rechargeable battery or a solar battery.

The indicator 1997 may indicate a particular state of the electronic device 1901 or a part of the electronic device (e.g., the AP 1910), including e.g., a booting state, a message state, or recharging state. The motor 1998 may convert an electric signal to a mechanical vibration and may generate a vibrational or haptic effect. Although not shown, a processing unit for supporting mobile TV, such as a GPU may be included in the electronic device 1901. The processing unit for supporting mobile TV may process media data conforming to a standard for digital multimedia broadcasting (DMB), digital video broadcasting (DVB), or mediaFLO.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 20:
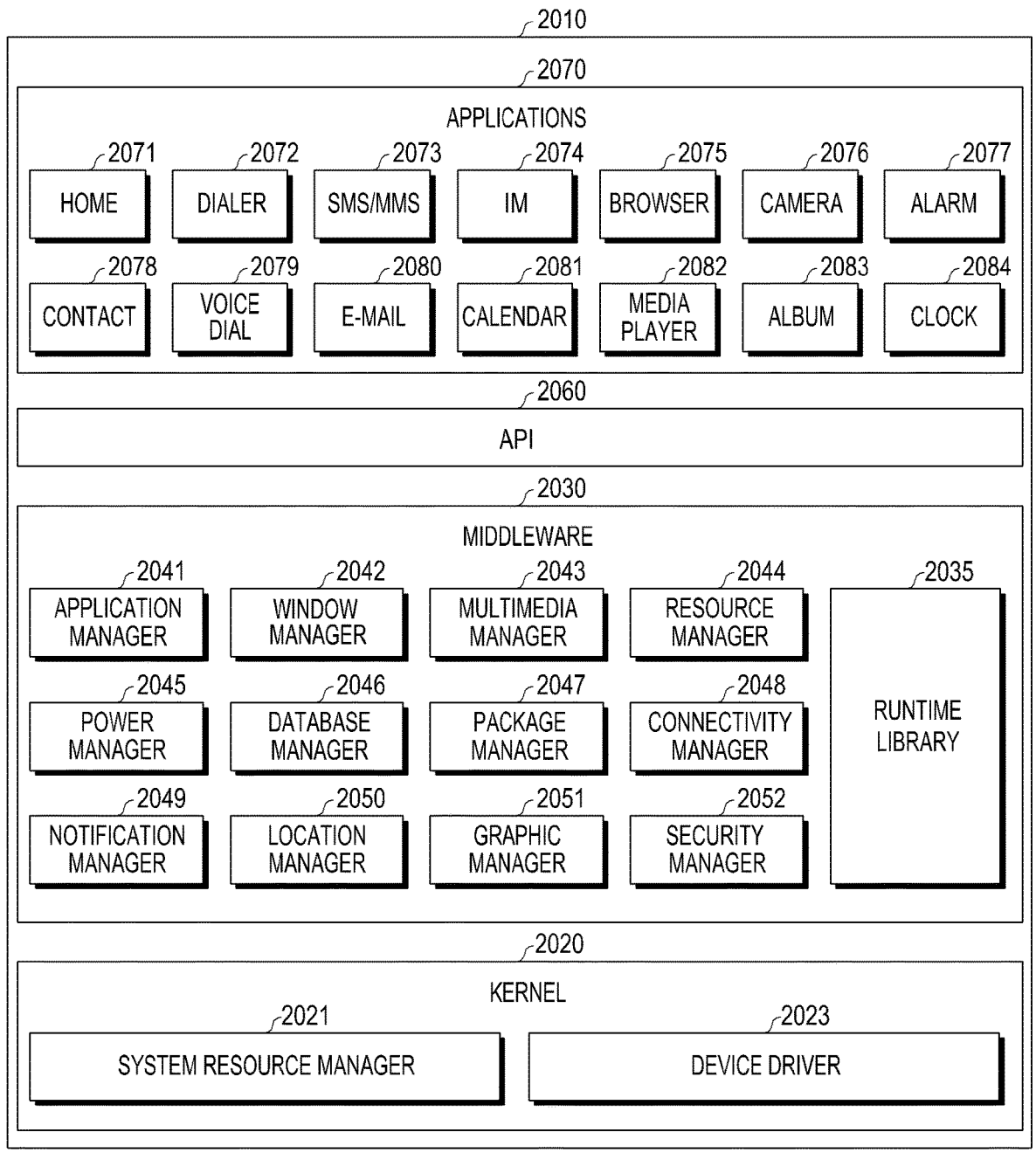
FIG. 20 is a block diagram illustrating a program module according to an embodiment of the present disclosure.

FIG. 20 is a block diagram illustrating a program module according to an embodiment of the present disclosure.

Referring to FIG. 20, the program module 2010 may include an OS controlling resources related to the electronic device and/or various applications (e.g., the application program) driven on the OS. The operating system may include, e.g., Android™, iOS™, Windows™, Symbian™, Tizen™, or Bada™.

The program 2010 may include, e.g., a kernel 2020, middleware 2030, an application programming interface (API) 2060, and/or an application 2070. At least a part of the program module 2010 may be preloaded on the electronic device or may be downloaded from a server.

The kernel 2020 may include, e.g., a system resource manager 2021 or a device driver 2023. The system resource manager 2021 may perform control, allocation, or recovery of system resources. According to an embodiment of the present disclosure, the system resource manager 2021 may include a process managing unit, a memory managing unit, or a file system managing unit. The device driver 2023 may include, e.g., a display driver, a camera driver, a BT driver, a shared memory driver, a USB driver, a keypad driver, a Wi-Fi driver, an audio driver, or an inter-process communication (IPC) driver.

The middleware 2030 may provide various functions to the application 2070 through the API 2060 so that the application 2070 may efficiently use limited system resources in the electronic device or provide functions jointly required by applications 2070. According to an embodiment of the present disclosure, the middleware 2030 may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, or a security manager 2052.

The runtime library 2035 may include a library module used by a compiler in order to add a new function through a programming language while, e.g., the application 2070 is being executed. The runtime library 2035 may perform input/output management, memory management, or operation on arithmetic functions.

The application manager 2041 may manage the life cycle of at least one application of, e.g., the applications 2070. The window manager 2042 may manage graphical user interface (GUI) resources used on the screen. The multimedia manager 2043 may grasp formats necessary to play various media files and use a codec appropriate for a format to perform encoding or decoding on media files. The resource manager 2044 may manage resources, such as source code of at least one of the applications 2070, memory or storage space.

The power manager 2045 may operate together with, e.g., a basic input/output system (BIOS) to manage battery or power and provide power information necessary for operating the electronic device. The database manager 2046 may generate, search, or vary a database to be used in at least one of the applications 2070. The package manager 2047 may manage installation or update of an application that is distributed in the form of a package file.

The connectivity manager 2048 may manage wireless connectivity, such as, e.g., Wi-Fi or BT. The notification manager 2049 may display or notify an event, such as a coming message, appointment, or proximity notification, of the user without interfering with the user. The location manager 2050 may manage locational information on the electronic device. The graphic manager 2051 may manage graphic effects to be offered to the user and their related user interface. The security manager 2052 may provide various security functions necessary for system security or user authentication. According to an embodiment of the present disclosure, when the electronic device (e.g., the electronic device of FIG. 8) has telephony capability, the middleware 2030 may further include a telephony manager for managing voice call or video call functions of the electronic device.

The middleware 2030 may include a middleware module forming a combination of various functions of the above-described components. The middleware 2030 may provide a specified module per type of the OS in order to provide a differentiated function. Further, the middleware 2030 may dynamically omit some existing components or add new components.

The API 2060 may be a set of, e.g., API programming functions and may have different configurations depending on OSs. For example, in the case of Android or iOS, one API set may be provided per platform, and in the case of Tizen, two or more API sets may be offered per platform.

The application 2070 may include one or more applications that may provide functions such as, e.g., a home 2071, a dialer 2072, a short message service (SMS)/multimedia message service (MMS) 2073, an instant message (IM) 2074, a browser 2075, a camera 2076, an alarm 2077, a contact 2078, a voice dial 2079, an email 2080, a calendar 2081, a media player 2082, an album 2083, or a clock 2084, a health-care (e.g., measuring the degree of workout or blood sugar), or provision of environmental information (e.g., provision of air pressure, moisture, or temperature information).

According to an embodiment of the present disclosure, the application 2070 may include an application (hereinafter, "information exchanging application" for convenience) supporting information exchange between the electronic device (e.g., the electronic device of FIG. 8) and an external electronic device. Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device. Further, the notification relay application may receive notification information from, e.g., the external electronic device and may provide the received notification information to the user. The device management application may perform at least one function of the external electronic device communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 2070 may include an application (e.g., a health-care application) designated depending on the attribute (e.g., as an attribute of the electronic device, the type of electronic device is a mobile medical device) of the external electronic device. According to an embodiment of the present disclosure, the application 2070 may include an application received from the external electronic device. According to an embodiment of the present disclosure, the application 2070 may include a preloaded application or a third party application downloadable from a server. The names of the components of the program module 2010 according to the shown embodiment may be varied depending on the type of OS.

According to an embodiment of the present disclosure, at least a part of the program module 2010 may be implemented in software, firmware, hardware, or in a combination of two or more thereof. At least a part of the programming module 2010 may be implemented (e.g., executed) by e.g., a processor (e.g., the AP 1910). At least a part of the program module 2010 may include e.g., a module, program, routine, set of instructions, process, or the like for performing one or more functions.

The term 'module' or 'functional unit' may refer to a unit including one of hardware, software, and firmware, or a combination thereof. The term 'module' or 'functional unit' may be interchangeably used with a unit, logic, logical block, component, or circuit. The term 'module' or 'functional unit' may be a minimum unit or part of an integrated component. The 'module' may be a minimum unit or part of performing one or more functions. The 'module' or 'functional unit' may be implemented mechanically or electronically. For example, the 'module' or 'functional unit' may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the controller 810), may enable the processor to carry out a corresponding function. The computer-readable storage medium may be e.g., the storage unit 820.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, a storage medium may store instructions configured to, when executed by at least one processor, enable the at least one processor to perform at least one operation that may include outputting a first service provided from a first device, when reception of the first service is paused, searching for a second device providing at least one second service corresponding to the first device, and sending a request for the at least one second service to the second device.

As is apparent from the foregoing description, according to various embodiments of the present disclosure, an electronic device and method for providing a service in the electronic device, when a service provided to the user in the electronic device is terminated or paused, may search and provide various types of services corresponding to the terminated or paused service, allowing the service or related services to continue to be offered to the user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
an interface; and
at least one processor configured to:
control the interface to output a first service, wherein the first service includes source content provided via a first device receiving the first service from a server,
perform an automated connection operation for the first service, based on a reception of the first service being paused,
identify, based on the reception of the first service being paused, a second device that receives at least one second service from the server and provides the at least one second service to the electronic device, the at least one second service corresponding to the first service, while performing the automated connection operation for the first service,
based on identifying the second device, stop the performing of the automated connection operation for the first service and transmit a request for the at least one second service to the identified second device, and
control the interface to output the at least one second service.

2. The electronic device of claim 1, wherein the at least one processor is further configured to:
store at least one service-related information related to the first service, and
identify the at least one second service using the stored at least one service-related information.

3. The electronic device of claim 2, wherein the service-related information includes at least one of identification information on the first service, tag information included in the first service, meta information on the first service, location information related to the first service, additional information on the first service, start time information on the first service, end time information on the first service, information on a time duration during which the first service is provided, information on a time when the first service is paused, valid term information on the first service, channel information on a broadcast, a broadcast name, a broadcast start time, a broadcast end time, additional information related to the broadcast, broadcast station information, or rebroadcast information on the broadcast.

4. The electronic device of claim 1, wherein the at least one second service includes a same service as the first service or a service related to the first service.

5. The electronic device of claim 1, wherein the at least one second service includes at least one of source content provided from a same source as the first service, source content provided from a different source from the first service and having a same content but a different format, at least one additional information related to source content, or information related to information included in the source content.

6. The electronic device of claim 1, wherein the at least one processor is further configured to, when there are a plurality of identified second services, select at least one of the plurality of identified second services to be output depending on a predetermined priority.

7. The electronic device of claim 6, wherein the predetermined priority includes at least one of a priority for a device and a server that provides the at least one second service, a priority for a network providing the at least one second service, or a priority for a type of the at least one second service.

8. The electronic device of claim 1, wherein the at least one processor is further configured to perform the discovery process according to a predetermined discovery period.

9. The electronic device of claim 8, wherein the predetermined discovery period is set considering at least one of a predetermined value, a value set by a user, a remaining battery time of the electronic device, motion information on the electronic device, or an importance of the at least one second service.

10. The electronic device of claim 1, wherein the at least one processor is further configured to:
determine a device from a plurality of devices, which are wirelessly connected to the electronic device, based on priority information of the plurality of devices, and
control the determined device to output the at least one second service.

11. The electronic device of claim 1, wherein the first device receives the first service from a first server, which is a source, and the second device receives the at least one second service from a second server, which is another source.

12. The electronic device of claim 1, wherein the first device receives the first service from a first server, which is a source, and the second device receives the at least one second service from the first server.

13. A method for providing a service in an electronic device, the method comprising:
outputting, by an interface of the electronic device, a first service, wherein the first service includes source content provided via a first device receiving the first service from a server;
performing an automated connection operation for the first service, based on a reception of the first service being paused;
identifying, based on the reception of the first service being paused, a second device that receives at least one second service from the server and provides the at least one second service to the electronic device, the at least one second service corresponding to the first service, while performing the automated connection operation for the first service; and
based on identifying the second device, stopping the performing of the automated connection operation for the first service and sending a request for the at least one second service to the identified second device.

14. The method of claim 13, wherein the identifying the at least one second service includes:
storing at least one service-related information related to the first service; and
identifying the at least one second service using the stored at least one service-related information.

15. The method of claim 14, wherein the service-related information includes at least one of identification information on the first service, tag information included in the first service, meta information on the first service, location information related to the first service, additional information on the first service, start time information on the first service, end time information on the first service, information on a time duration during which the first service is provided, information on a time when the first service is paused, valid term information on the first service, channel information on a broadcast, a broadcast name, a broadcast start time, a broadcast end time, additional information related to the broadcast, broadcast station information, or rebroadcast information on the broadcast.

16. The method of claim 13, wherein the at least one second service includes a same service as the first service or a service related to the first service.

17. The method of claim 13, wherein the at least one second service includes at least one of source content provided from a same source as the first service, source content provided from a different source from the first service and having a same content but a different format, at least one additional information related to source content, or information related to information included in the source content.

18. The method of claim 13, further comprising, when there are a plurality of identified second services, selecting at least one of the plurality of identified second services to be output depending on a predetermined priority.

19. The method of claim 18, wherein the predetermined priority includes at least one of a priority for a device and a server that may provide the at least one second service, a priority for a network providing the at least one second service, or a priority for a type of the at least one second service.

20. The method of claim 13, wherein the identifying the at least one second service includes performing the discovery process according to a predetermined discovery period.

21. The method of claim 20, wherein the predetermined discovery period is set considering at least one of a predetermined value, a value set by a user, a remaining battery time of the electronic device, motion information on the electronic device, or an importance of the at least one second service.

22. The method of claim 13, further comprising:
determining a device from a plurality of devices, which are wirelessly connected to the electronic device, based on priority information of the plurality of devices; and
controlling the determined device to output the at least one second service.

* * * * *